(12) United States Patent
Oshita et al.

(10) Patent No.: US 11,279,789 B2
(45) Date of Patent: Mar. 22, 2022

(54) HYDROGENATED BLOCK COPOLYMER, RESIN COMPOSITION, PRESSURE-SENSITIVE ADHESIVE, ADHESIVE, MOLDED OBJECT, LIQUID-PACKAGING CONTAINER, MEDICAL TOOL, MEDICAL TUBE, CORNER MEMBER FOR WEATHER SEAL, AND WEATHER SEAL

(71) Applicant: KURARAY CO., LTD., Kurashiki (JP)

(72) Inventors: Shinya Oshita, Kamisu (JP); Yusuke Nojima, Kamisu (JP); Mikio Masuda, Kamisu (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 17/089,404

(22) Filed: Nov. 4, 2020

(65) Prior Publication Data

US 2021/0122868 A1  Apr. 29, 2021

Related U.S. Application Data

(62) Division of application No. 15/552,733, filed as application No. PCT/JP2016/055307 on Mar. 23, 2016, now abandoned.

(30) Foreign Application Priority Data

Feb. 24, 2015  (JP) .............................. JP2015-033855

(51) Int. Cl.
| | | |
|---|---|---|
| *C08F 297/04* | (2006.01) | |
| *C08L 53/02* | (2006.01) | |
| *C08L 23/10* | (2006.01) | |
| *B32B 27/06* | (2006.01) | |
| *B32B 7/12* | (2006.01) | |
| *C08C 19/02* | (2006.01) | |

(Continued)

(52) U.S. Cl.
CPC ............ *C08F 297/046* (2013.01); *B32B 7/12* (2013.01); *B32B 25/08* (2013.01); *B32B 27/06* (2013.01); *B32B 27/08* (2013.01); *B32B 27/32* (2013.01); *B65D 65/40* (2013.01); *C08C 19/02* (2013.01); *C08F 297/04* (2013.01); *C08L 23/10* (2013.01); *C08L 23/14* (2013.01); *C08L 53/02* (2013.01); *C08L 53/025* (2013.01); *C09J 123/14* (2013.01); *C09J 153/02* (2013.01); *C09J 153/025* (2013.01); *B32B 2250/03* (2013.01); *B32B 2250/24* (2013.01); *B32B 2307/306* (2013.01); *B32B 2307/412* (2013.01); *B32B 2307/546* (2013.01); *B32B 2307/712* (2013.01); *B32B 2439/00* (2013.01); *B32B 2535/00* (2013.01); *B32B 2581/00* (2013.01)

(58) Field of Classification Search
CPC .... C08F 297/046; C08F 297/04; C08L 23/14; C08L 53/02; C09J 123/14; B32B 27/08; B32B 27/32; B32B 2250/03; B32B 2439/00; B65D 65/40
See application file for complete search history.

(56) References Cited

U.S. PATENT DOCUMENTS

| | | |
|---|---|---|
| 2002/0104544 A1 | 8/2002 | Ogushi et al. |
| 2003/0232212 A1* | 12/2003 | Chundury ............... B32B 27/08 428/515 |

(Continued)

FOREIGN PATENT DOCUMENTS

| | | |
|---|---|---|
| EP | 2 644 653 A1 | 10/2013 |
| JP | 8-208911 A | 8/1996 |

(Continued)

OTHER PUBLICATIONS

Office Action dated Oct. 23, 2019 in Japanese Patent Application No. 2016-255333.

(Continued)

*Primary Examiner* — Robert D Harlan
(74) *Attorney, Agent, or Firm* — Oblon, McClelland, Maier & Neustadt, L.L.P.

(57) ABSTRACT

Provided are a hydrogenated block copolymer capable of giving a resin composition having good moldability and sufficient mechanical strength and excellent in flexibility, kink resistance and transparency and also excellent in pressure sensitive adhesiveness, adhesiveness and weather resistance, and a resin composition containing the hydrogenated block copolymer, as well as a pressure sensitive adhesive, an adhesive, a molded article, a liquid-packaging container, a medical tool, a medical tube, a corner member for weather seal, and a weather seal that are produced using these. Specifically, the hydrogenated block copolymer is a hydrogenated block copolymer prepared by hydrogenating a block copolymer that contains at least a polymer block (A) consisting mainly of a structural unit derived from an aromatic vinyl compound, and a polymer block (B) consisting mainly of a structural unit derived from isoprene, a structural unit derived from butadiene, or a structural unit derived from a mixture of isoprene and butadiene, wherein the content of the polymer block (A) is 1% by mass or more and less than 5% by mass relative to the total amount of the hydrogenated block copolymer, the total content of the 1,2-bond and the 3,4-bond of the polymer block (B) is 30 to 85 mol %, the hydrogenation rate of the polymer block (B) is 80 mol % or more, and the weight average molecular weight of the hydrogenated block copolymer is 150,000 to 800,000.

17 Claims, 2 Drawing Sheets

(51) Int. Cl.
*C09J 153/02* (2006.01)
*B32B 25/08* (2006.01)
*B32B 27/08* (2006.01)
*B32B 27/32* (2006.01)
*B65D 65/40* (2006.01)
*C08L 23/14* (2006.01)
*C09J 123/14* (2006.01)

(56) References Cited

U.S. PATENT DOCUMENTS

| | | |
|---|---|---|
| 2005/0009990 A1 | 1/2005 | Knoll et al. |
| 2005/0222356 A1 | 10/2005 | Joly et al. |
| 2011/0091708 A1* | 4/2011 | Noda .................... C08L 53/025 428/220 |
| 2015/0353669 A1 | 12/2015 | Araki et al. |

FOREIGN PATENT DOCUMENTS

| | | |
|---|---|---|
| JP | 9-291181 A | 11/1997 |
| JP | 10-67894 A | 3/1998 |
| JP | 2002-248671 A | 9/2002 |
| JP | 2003-49046 A | 2/2003 |
| JP | 2004-97600 A | 4/2004 |
| JP | 2004-124070 A | 4/2004 |
| JP | 2005-8763 A | 1/2005 |
| JP | 2005-510612 A | 4/2005 |
| JP | 2005-516099 A | 6/2005 |
| JP | 2007-106985 A | 4/2007 |
| JP | 2009-179766 A | 8/2009 |
| JP | 2011-255652 A | 12/2011 |
| JP | 5043947 B2 | 10/2012 |
| WO | WO 2006/134974 A1 | 12/2006 |
| WO | WO 2009/133930 A1 | 11/2009 |
| WO | WO 2010/104068 A1 | 9/2010 |
| WO | WO 2014/112411 A1 | 7/2014 |
| WO | WO 2015/156334 A1 | 10/2015 |

OTHER PUBLICATIONS

International Search Report dated May 17, 2016, in PCT/JP2016/055307 filed Feb. 23, 2016.

* cited by examiner

[Fig. 1]
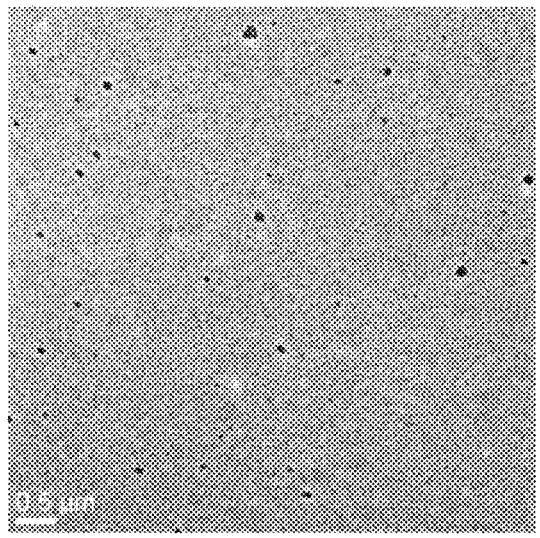
[Fig. 2]
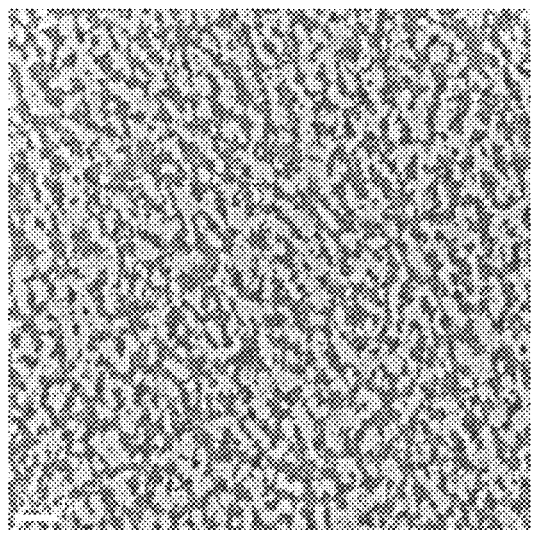

[Fig. 3]
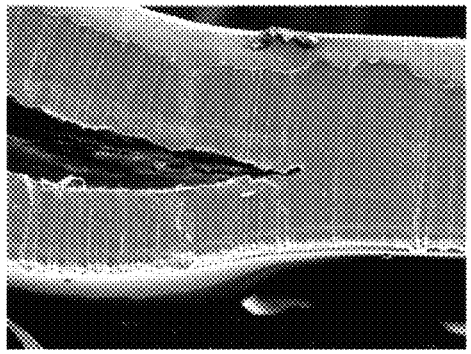
Crack Propagation Mode A
[Fig. 4]
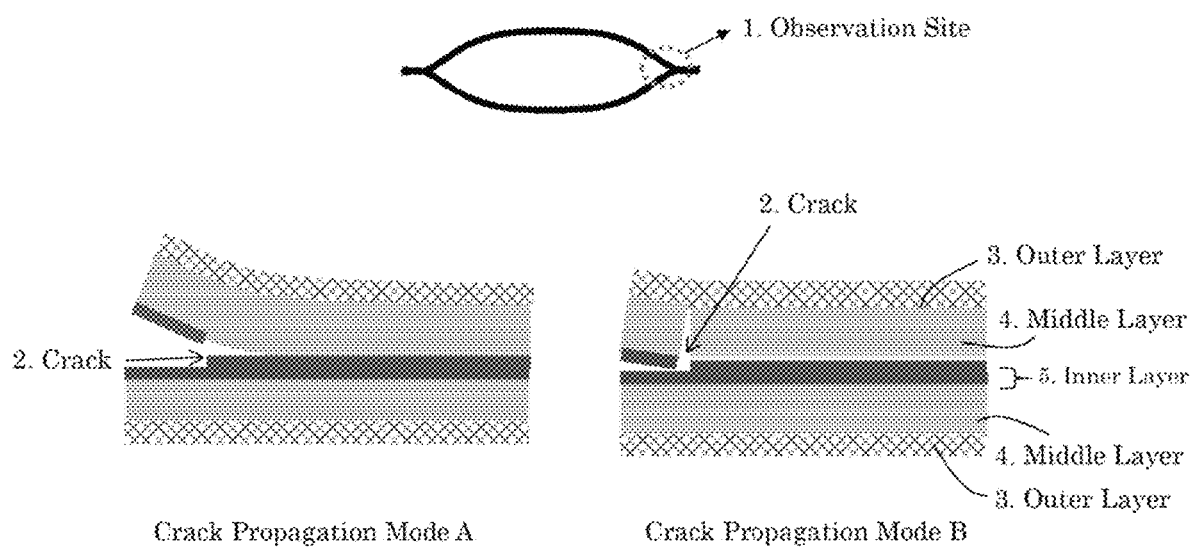
Crack Propagation Mode A      Crack Propagation Mode B

US 11,279,789 B2

HYDROGENATED BLOCK COPOLYMER, RESIN COMPOSITION, PRESSURE-SENSITIVE ADHESIVE, ADHESIVE, MOLDED OBJECT, LIQUID-PACKAGING CONTAINER, MEDICAL TOOL, MEDICAL TUBE, CORNER MEMBER FOR WEATHER SEAL, AND WEATHER SEAL

CROSS-REFERENCE TO RELATED APPLICATIONS

The present application is divisional of U.S. application Ser. No. 15/552,733, filed Aug. 22, 2017, which is a National Stage (371) of PCT/JP2016/055307, filed Feb. 23, 2016, and claims priority to JP 2015-033855, filed Feb. 24, 2015.

TECHNICAL FIELD

The present invention relates to a hydrogenated block copolymer, a resin composition containing the hydrogenated block copolymer, a pressure sensitive adhesive, an adhesive, a molded article, a liquid-packaging container, a medical tool, a medical tube, a corner member for weather seal, and a weather seal.

BACKGROUND ART

Heretofore, various hydrogenated block copolymers have been proposed, which contains a polymer block (A) consisting mainly of a structural unit derived from an aromatic vinyl compound and a polymer block (B) consisting mainly of a structural unit derived from a conjugated diene compound an in which the carbon-carbon double bond derived from the conjugated diene compound-derived structural unit is hydrogenated, and are used as alternatives to vulcanized rubber and soft polyvinyl chloride in production of various molded articles. Polyolefinic resins are excellent in oil resistance, heat resistance, chemical resistance and the like but are poor in flexibility, transparency and impact resistance, and consequently, by adding the above-mentioned hydrogenated block copolymer thereto, the resultant polyolefinic resin composition is used in a wide range of applications for food transportation, home electronics members, medical use, etc.

For example, PTL 1 discloses a tube produced by molding a resin composition that contains a hydrogenated block copolymer in which the content of a polymer block (A) consisting mainly of a structural unit derived from an aromatic vinyl compound is 5 to 40% by mass, a hydrogenated block copolymer in which the content of the polymer block (A) is 10 to 40% by mass and which differs from the former hydrogenated block copolymer in the glass transition temperature, and a polyolefinic resin, and discloses a medical tool using the tube. PTL 2 discloses a tube containing a styrenic thermoplastic elastomer in which the content of a polymer block (A) containing an aromatic compound is 5 to 40% by mass and a polypropylenic resin in a specific ratio by mass, and discloses a medical tool using the tube. PTL 3 discloses a resin composition prepared by blending a specific hydrogenated block copolymer having an aromatic vinyl compound content of 10 to 40% by mass and a polypropylenic resin, and a medical tool formed of the composition.

CITATION LIST

Patent Literature

PTL 1: Japanese Patent 5043947
PTL 2: WO2010/104068
PTL 3: JP 10-67894 A

SUMMARY OF INVENTION

Technical Problem

As described above, various types of hydrogenated block copolymers and resin composition using the hydrogenated block copolymers have been proposed and especially for use for medical tools, a property resistant to excessive deformation such as buckling or the like to occur when bent in a ring or in an arc in molding into tubes (kink resistance) is important in addition to flexibility, and further improvement of performance is desired. In addition, not only good moldability is needed but also in the case where the resin composition is molded for use for liquid-packaging containers for medical use or the like, it is desired that the composition is excellent in flexibility, transparency and moldability and that, in addition and from the viewpoint of the breaking resistance thereof, the container is excellent in mechanical strength and the crack propagation morphology thereof is a favorable one.

The above-mentioned prior-art technologies are excellent in some of these performances but could not satisfy both moldability and mechanical strength while improving more flexibility and kink resistance, and it is desired to develop a resin composition capable of satisfying these performances in a well-balanced manner.

Further, for example, from the viewpoint of applicability to pressure sensitive adhesives and adhesives and also to other uses in a broad range, it is also desired to develop a resin composition excellent in pressure sensitive adhesiveness, adhesiveness, weather resistance, etc.

Given the situation, an object of the present invention is to provide a hydrogenated block copolymer capable of giving a resin composition having good moldability and sufficient mechanical strength, excellent in flexibility, kink resistance and transparency, and excellent in pressure sensitive adhesiveness, adhesiveness and weather resistance, to provide a resin composition containing the hydrogenated block copolymer, and to provide a pressure sensitive adhesive, an adhesive, a molded article, a liquid-packaging container, a medical tool, a medical tube, a corner member for weather seal, and a weather seal, which can be obtained by using the same.

Solution to Problem

As a result of assiduous studies, the present inventors have found that a hydrogenated block copolymer in which at least the content of a polymer block (A) consisting mainly of a structural unit derived from an aromatic vinyl compound falls within a specific range, and the total content of the 1,2-bond and the 3,4-bond in a polymer block (B) having a specific structural unit and the hydrogenation rate thereof each fall within a specific range, and which has a specific weight average molecular weight can solve the above-mentioned problems, and have completed the present invention.

Specifically, the present invention relates to the following [1] to [28]:

[1] A hydrogenated block copolymer prepared by hydrogenating a block copolymer that contains at least a polymer block (A) consisting mainly of a structural unit derived from an aromatic vinyl compound, and a polymer block (B) consisting mainly of a structural unit derived from isoprene, a structural unit derived from butadiene, or a structural unit derived from a mixture of isoprene and butadiene, wherein:

the content of the polymer block (A) is 1% by mass or more and less than 5% by mass relative to the total amount of the hydrogenated block copolymer, the total content of the 1,2-bond and the 3,4-bond in the polymer block (B) is from 30 to 85 mol %, the hydrogenation rate of the polymer block (B) is 80 mol % or more, and the weight average molecular weight of the hydrogenated block copolymer is from 150,000 to 800,000.

[2] The hydrogenated block copolymer of the above [1], wherein the weight average molecular weight of at least one polymer block (A) of the polymer block (A) is from 3,000 to 15,000.

[3] The hydrogenated block copolymer of the above [1] or [2], wherein the weight average molecular weight of at least one polymer block (A) of the polymer block (A) is from 300 to 2,500.

[4] The hydrogenated block copolymer of any of the above [1] to [3], wherein the total weight average molecular weight of the polymer block (A) is from 3,500 to 15,000.

[5] The hydrogenated block copolymer of any of the above [1] to [4], wherein the total weight average molecular weight of the polymer block (A) is from 4,500 to 15,000.

[6] The hydrogenated block copolymer of any of the above [1] to [5], which is a linear triblock copolymer or diblock copolymer.

[7] The hydrogenated block copolymer of the above [6], which is a triblock copolymer having two above polymer blocks (A) and one above polymer block (B) of a type of A-B-A (where A is the polymer block (A) and B is the polymer block (B)).

[8] The hydrogenated block copolymer of any of the above [1] to [7], wherein the polymer block (B) is a polymer block consisting mainly of a structural unit derived from a mixture of isoprene and butadiene, and the blending ratio of isoprene and butadiene is, as a molar ratio, isoprene/butadiene=10/90 to 90/10.

[9] A resin composition containing (a) the hydrogenated block copolymer of any of the above [1] to [8], and (b) a polyolefinic resin, wherein the content ratio of the component (a) to the component (b) [(a)/(b)] is, as a ratio by mass, from 1/99 to 99/1.

[10] The resin composition of the above [9], wherein the component (a) contains a hydrogenated block copolymer in which the total weight average molecular weight of the polymer block (A) is 3,500 to 7,000 and a hydrogenated block copolymer in which the total weight average molecular weight of the polymer block (A) is more than 7,000 and 15,000 or less.

[11] The resin composition of the above [9] or [10], wherein the olefin that constitutes the component (b) is an olefin having 2 to 10 carbon atoms.

[12] The resin composition of any of the above [9] to [11], wherein the component (b) is a polypropylenic resin selected from the group consisting of a homopolypropylene, a propylene-ethylene random copolymer, a propylene-ethylene block copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer and a propylene-ethylene-hexene random copolymer.

[13] The resin composition of any of the above [9] to [12], wherein the component (b) is a polyolefinic resin containing a polar group.

[14] The resin composition of the above [13], wherein the polar group is at least one selected from the group consisting of a (meth)acryloyloxy group, a hydroxy group, an amide group, a halogen atom, a carboxy group, an ester group represented by —COOR (R is an alkyl group having 1 to 10 carbon atoms or an aryl group having 6 to 20 carbon atoms), and an acid anhydride group.

[15] A pressure sensitive adhesive containing the hydrogenated block copolymer of any of the above [1] to [8].

[16] An adhesive containing the resin composition of any of the above [9] to [14].

[17] A molded article containing at least one selected from the group consisting of a ceramic, a metal, a polar resin and a polyolefinic resin, and the adhesive of the above [16].

[18] A liquid-packaging container containing a layer formed of the resin composition of any of the above [9] to [14].

[19] The liquid-packaging container of the above [18], which is formed of a laminate of at least three layers having an inner layer, a middle layer and an outer layer, wherein at least one layer of the inner layer, the middle layer and the outer layer is formed of the resin composition of any of the above [9] to [14].

[20] The liquid-packaging container of the above [19], wherein both the inner layer and the middle layer or any one layer of the inner layer or the middle layer is formed of the resin composition of any of the above [9] to [14], and wherein:

the melting point $MP_{in}$ of the resin component constituting the inner layer and the melting point $MP_{mid}$ of the resin component constituting the middle layer satisfy the following expression:

$$MP_{in} < MP_{mid}.$$

[21] The liquid-packaging container of the above [19] or [20], wherein the inner layer is formed of the resin composition of any of the above [9] to [14], and the melting point $MP_{in}$ of the resin component constituting the inner layer and the melting point $MP_{out}$ of the resin component constituting the outer layer satisfy the following expression:

$$0 < MP_{out} - MP_{in} \leq 50.$$

[22] The liquid-packaging container of any of the above [19] to [21], wherein at least the inner layer is formed of the resin composition of any of [9] to [14].

[23] The liquid-packaging container of any of the above [19] to [22], wherein the thickness of each layer is from 5 to 30 μm of the inner layer, from 100 to 300 μm of the middle layer, and from 15 to 120 μm of the outer layer.

[24] A medical tool, which is formed of the resin composition of any of [9] to [14].

[25] A medical tube, which is formed of the resin composition of any of [9] to [14].

[26] A resin composition containing (I) the hydrogenated block copolymer of any of the above [1] to [8], (II) a polyolefinic resin and (III) a softening agent.

[27] A corner member for weather seal, which has a part formed of the resin composition of the above [26].

[28] A weather seal, which has a member that has a part formed of the resin composition of the above [26].

Advantageous Effects of Invention

According to the present invention, there can be provided a hydrogenated block copolymer capable of giving a resin composition having good moldability and sufficient mechanical strength, excellent in flexibility, kink resistance and transparency, and excellent in pressure sensitive adhesiveness, adhesiveness and weather resistance. As having the above-mentioned properties, the hydrogenated block copolymer of the present invention and the resin composition containing the hydrogenated block copolymer can provide, in particular, a pressure sensitive adhesive, an adhesive, a molded article, a liquid-packaging container, a medical tool, a medical tube, a corner member for weather seal, and a weather seal.

BRIEF DESCRIPTION OF DRAWINGS

FIG. 1 is a photograph, as taken with a transmission electron microscope, of a phase-separated structure of the resin composition obtained in Example 1.

FIG. 2 is a photograph, as taken with a transmission electron microscope, of a phase-separated structure of the resin composition obtained in Comparative Example 6.

FIG. 3 is a photograph taken with a scanning electron microscope in observing the crack propagation morphology in Example 35.

FIG. 4 includes schematic views each showing a crack propagation morphology observation part of a liquid-packaging container in Examples 35 to 38 and Comparative Examples 23 to 25, and a crack propagation morphology.

DESCRIPTION OF EMBODIMENTS

[Component (a): Hydrogenated Block Copolymer]

The hydrogenated block copolymer of the present invention [hereinafter referred to as a hydrogenated block copolymer (a)] is one prepared by hydrogenating a block copolymer that contains at least a polymer block (A) consisting mainly of a structural unit derived from an aromatic vinyl compound (hereinafter abbreviated as an aromatic vinyl compound unit), and a polymer block (B) consisting mainly of a structural unit derived from isoprene (hereinafter abbreviated as an isoprene unit), a structural unit derived from butadiene (hereinafter abbreviated as a butadiene unit), or a structural unit derived from a mixture of isoprene and butadiene (hereinafter abbreviated as an isoprene/butadiene unit).

Hereinunder the polymer block (A) and the polymer block (B) are described in sequence.

(Polymer Block (A))

The polymer block (A) consists mainly of an aromatic vinyl compound unit. Here, "consisting mainly of" means that the polymer block (A) contains an aromatic vinyl compound unit in a ratio of 50% by mass or more based on the total mass of the polymer block (A). The content of the aromatic vinyl compound unit in the polymer block (A) is preferably 70% by mass or more based on the total mass of the polymer block (A), more preferably 90% by mass or more, even more preferably 95% by mass or more, and may be substantially 100% by mass.

Examples of the aromatic vinyl compound of a raw material to constitute the polymer block (A) include styrene, o-methylstyrene, m-methylstyrene, p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methyl styrene, β-methyl-o-methylstyrene, β-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, o-chlorostyrene, m-chlorostyrene, β-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-t-butylstyrene, m-t-butylstyrene, p-t-butylstyrene, o-methoxystyrene, m-methoxystyrene, p-methoxystyrene, o-chloromethylstyrene, m-chloromethylstyrene, p-chloromethylstyrene, o-bromomethylstyrene, m-bromomethylstyrene, p-bromomethylstyrene, silyl group-substituted styrene derivatives, indene, vinylnaphthalene, etc. One alone or two or more kinds of these aromatic vinyl compounds may be used. Above all, from the viewpoint of the balance of production cost and physical properties, styrene, α-methylstyrene, and a mixture thereof are preferred, and styrene is more preferred.

However, so far as not interfering with the objects and the effects of the present invention, the polymer block (A) may contain a structural unit derived from any other unsaturated monomer than aromatic vinyl compounds (hereinafter abbreviated as an other unsaturated monomer unit) in a ratio of 10% by mass or less. Examples of the other unsaturated monomer include at least one selected from the group consisting of butadiene, isoprene, 2,3-dimethylbutadiene, 1,3-pentadiene, 1,3-hexadiene, isobutylene, methyl methacrylate, methyl vinyl ether, N-vinylcarbazole, β-pinene, 8,9-p-menthene, dipentene, methylnorbornene, 2-methylenetetrahydrofuran, etc. The bonding mode in the case where the polymer block (A) contain the other unsaturated monomer unit is not specifically limited, and may be any of random or tapered ones.

The hydrogenated block copolymer (a) of the present invention may contain at least one above polymer block (A). In the case here the hydrogenated block copolymer (a) contains 2 or more polymer blocks (A), these polymer blocks (A) may be the same or different. In this description, the wording "different polymer blocks" means that at least one of the monomer units constituting the polymer block, the weight average molecular weight, the molecular weight distribution, the stereoregularity, and in the case where the block contains plural monomer units, the ratio of the monomer units and the copolymerization mode (random, gradient, block) differs between the blocks.

Among the polymer block (A) that the hydrogenated block copolymer (a) has, the weight average molecular weight of at least one polymer block (A) is preferably 3,000 to 15,000, more preferably 3,000 to 12,000. When the hydrogenated block copolymer (a) has at least one polymer block (A) whose weight average molecular weight falls within the above range, the mechanical strength of the resin composition containing the hydrogenated block copolymer (a) increases more and additionally the composition is excellent in film formability and tube formability.

As one embodiment of the present invention and from the viewpoint of lowering the molding temperature, the weight average molecular weight of at least one polymer block (A) among the polymer block (A) that the hydrogenated block copolymer (a) has is preferably 300 to 2,500, more preferably 300 to 2,000, even more preferably 300 to 1,200. This embodiment is especially suitable to production of tubes, and is excellent as an embodiment of a medical tube, etc.

Further, from the viewpoint of mechanical strength and from the viewpoint of lowering the molding temperature to maintain a predetermined melt tension in molding, the copolymer preferably has both a polymer block (A) having a weight average molecular weight of 3,000 to 15,000 (preferably 3,000 to 6,000) and a polymer block (A) having a weight average molecular weight of 300 to 2,500 (preferably 1,300 to 2,500), and more preferably has each one at the molecular terminal of triblocks, and also in these cases, the embodiment is especially excellent as an embodiment of medical tubes and the like, like those mentioned above.

The total weight average molecular weight of the polymer block (A) that the hydrogenated block copolymer (a) has is, from the viewpoint of mechanical strength, pressure sensitive adhesiveness and adhesiveness, preferably 3,500 to 15,000, more preferably 4,500 to 15,000, even more preferably 4,500 to 12,000, still more preferably 5,000 to 11,000, and most preferably 8,000 to 11,000.

In the present invention, from the viewpoint of the balance of moldability, flexibility, mechanical strength and kink resistance, it is also preferable to use, as the hydrogenated block copolymer (a), a combination of a hydrogenated block copolymer in which the total weight average molecular weight of the polymer block (A) is 3,500 to 7,000 and a hydrogenated block copolymer in which the total weight average molecular weight of the polymer block (A) is more than 7,000 and 15,000 or less.

The total weight average molecular weight of the polymer block (A) means, in the case where the hydrogenated block copolymer (a) contains two or more polymer blocks (A), the total weight average molecular weight thereof, but means, in the case where the hydrogenated block copolymer (a) contains only one polymer block (A), the weight average molecular weight of the polymer block (A). When the total weight average molecular weight of the polymer block (A) that the hydrogenated block copolymer (a) has falls within the above range, the mechanical strength of the hydrogenated block copolymer (a) is higher.

The "weight average molecular weight" stated in the description and in the claims is everywhere a standard polystyrene-equivalent weight average molecular weight measured through gel permeation chromatography (GPC), and is more precisely a value measured according to the method described in the section of Examples. The weight average molecular weight of the polymer block (A) that the hydrogenated block copolymer (a) has may be determined by analyzing the liquid that is sampled every time after the polymerization to give each polymer block in the production process. For example, in the case of a triblock copolymer having a structure of A-B-A, the first polymer block A and polymer block B are analyzed to measure the weight average molecular weight thereof according to the above-mentioned method, and by subtracting these from the weight average molecular weight of the hydrogenated block copolymer (a), the weight average molecular weight of the second polymer block (A) can be thereby determined. As another method for the case of the triblock copolymer having a structure of A-B-A, the total weight average molecular weight of the polymer block (A) may be calculated from the weight average molecular weight of the hydrogenated block copolymer (a) and the total content of the polymer block (A) as confirmed through $^1$H-NMR, in which the weight average molecular weight of the deactivated first polymer block (A) is calculated through GPC, and by subtracting it, the weight average molecular weight of the second polymer block (A) can be obtained.

In the hydrogenated block copolymer (a) of the present invention, the content of the polymer block (A) (in the case where the copolymer has plural polymer blocks (A), the total content thereof) is 1% by mass or more and less than 5% by mass relative to the sum total of the hydrogenated block copolymer (a). When the content of the polymer block (A) falls within the above range, the hydrogenated block copolymer (a) can be more excellent in flexibility and kink resistance. The content of the polymer block (A) is preferably 1% by mass or more and 4.5% by mass or less, more preferably 2% by mas or more and 4.5% by mass or less, even more preferably 2.5% by mass or more and 4.5% by mass or less.

The content of the polymer block (A) in the hydrogenated block copolymer (a) is a value measured through $^1$H-NMR spectrometry, and more precisely, a value measured according to the method described in the section of Examples.

(Polymer Block (B))

The polymer block (B) consists mainly of an isoprene unit, a butadiene unit, or units of isoprene and butadiene. Here, "consisting mainly of" means that the polymer block (B) contains the above-mentioned structural unit in a ratio of 50% by mass or more based on the total mass of the polymer block (B). The content of the structural unit derived from isoprene and/or butadiene in the polymer block (B) is more preferably 70% by mass or more based on the total mass of the polymer block (B), more preferably 90% by mass or more, even more preferably 95% by mass or more, and may be substantially 100% by mass.

The polymer block (B) may further contain, as a structural unit derived from a conjugated diene compound except isoprene and butadiene, for example, a structural unit derived from at least one selected from 2,3-dimethylbutadiene, 1,3-pentadiene, 1,3-hexadiene, etc.

As described above, the polymer block (B) consists mainly of an isoprene unit, a butadiene unit, or units of isoprene and butadiene, and preferably consists mainly of a butadiene unit or units of isoprene and butadiene from the viewpoint that the mechanical strength (especially rubber elasticity) of the resin composition containing the hydrogenated block copolymer (a) is excellent. Further, consisting mainly of units of isoprene and butadiene is more preferred in that in the resin composition containing the resultant hydrogenated block copolymer (a) and a polyolefinic resin (b) to be mentioned hereinunder, the compatibility of the two components ((a) and (b)) is bettered. The blending ratio of isoprene and butadiene is not specifically limited, but from the viewpoint of performance advances, the molar ratio thereof is preferably isoprene/butadiene=10/90 to 90/10, more preferably 30/70 to 70/30, even more preferably 40/60 to 60/40. In the case where the polymer block (B) has a constitution consisting mainly of units of isoprene and butadiene, the bonding mode thereof is not specifically limited, and may be random, tapered, completely alternate, partially block or block, or may be in the form of a combination of two or more of these.

Regarding the bonding mode of isoprene and butadiene to constitute the polymer block (B), butadiene may take 1,2-bond or 1,4-bond, and isoprene may take 1,2-bond, 3,4-bond or 1,4-bond. In the hydrogenated block copolymer (a) of the present invention, the total content of the 1,2-bond and the 3,4-bond in the polymer block (B) must be 30 to 85 mol %. When the total content of the 1,2-bond and the 3,4-bond in the polymer block (B) is more than 85 mol %, the glass transition temperature (Tg) of the resultant hydrogenated block copolymer (a) may be too high and, if so, the molded article such as a film, a tube or the like using the resin composition that contains the hydrogenated block copolymer (a) may lose flexibility, and especially in use in a cold area, the molded article may lose flexibility. On the other hand, when the total content of the 1,2-bond and the 3,4-bond in the polymer block (B) is less than 30 mol %, the compatibility of the hydrogenated block copolymer (a) and the polyolefinic resin (b) to be mentioned below in the resin composition containing the two would be insufficient and therefore the flexibilization effect would be lost and the transparency would be insufficient. In the case where the polymer block (B) is formed of butadiene alone, the above-mentioned phrase "the total content of the 1,2-bond and the 3,4-bond is 30 to 85 mol" shall be deemed to be replaced with "the content of the 1,2-bond is 30 to 85 mol %".

The total content of the 1,2-bond and the 3,4-bond in the polymer block (B) must be 30 to 85 mol, but is preferably 45 to 80 mol %, more preferably 55 to 75 mol %. The content of the 1,2-bond and the 3,4-bond is a value calculated through $^1$H-NMR according to the method described in the section of Examples.

In this description, in the case where the polymer block (B) contains an isoprene unit, the total amount of the 1,2-bond amount and the 3,4-bond amount may be referred to as a vinyl bond amount, and in the case where the polymer block (B) consists of a butadiene unit, the 1,2-bond amount may be referred to as a vinyl bond amount.

The glass transition temperature of the polymer block (B) is preferably −50 to 30° C., more preferably −40 to 10° C., even more preferably −40 to 0° C. When the glass transition temperature of the polymer block (B) is lower than −50° C., the compatibility of the resultant hydrogenated block copolymer (a) and the polyolefinic resin (b) to be mentioned below would worsen, and in addition, the flexibility, the transparency and the kink resistance of the resultant resin composition would also lower; but on the other hand, when higher than 30° C., the low-temperature impact resistance of the resin composition would lower unfavorably. The glass transition temperature in this description means a glass transition temperature measured with a differential scanning calorimeter at a heating rate of 10° C./min.

So far as not interfering with the object and the effect of the present invention, the polymer block (B) may contain a structural unit derived from any other polymerizing monomer than an isoprene unit and a butadiene unit, generally preferably in a ratio of 30% by mass or less based on the total mass of the polymer block (B), more preferably 10% by mass or less. Preferred examples of the other polymerizing monomer include at least one compound selected from the group consisting of aromatic vinyl compounds such as styrene, α-methylstyrene, o-methylstyrene, m-methylstyrene, p-methylstyrene, p-t-butylstyrene, 2,4-dimethylstyrene, vinylnaphthalene, vinylanthracene, etc.; as well as methyl methacrylate, methyl vinyl ether, N-vinylcarbazole, β-pinene, 8,9-p-menthene, dipentene, methylenenorbornene, 2-methylenetetrahydrofuran, etc. In the case where the polymer block (B) contain a structural unit derived from any other polymerizing monomer than an isoprene unit and a butadiene unit, the bonding mode thereof is not specifically limited, and may be any of a random or tapered one.

The hydrogenated block copolymer (a) of the present invention may contain at least one above polymer block (B). In the case where the hydrogenated block copolymer (a) has two or more polymer blocks (B), these polymer blocks (B) may be the same or different.

From the viewpoint of heat resistance, weather resistance, transparency and compatibility with the polyolefinic resin (b) to be mentioned below, the hydrogenation rate of the polymer block (B) is 80 mol % or more. The hydrogenation rate of the polymer block (B) is more preferably 85 mol % or more, even more preferably 90 mol % or more. Hydrogenation within the range of the carbon-carbon double bond that the polymer block (B) has betters heat resistance, weather resistance, transparency and compatibility with the polyolefinic resin (B), and therefore the resultant resin composition becomes useful for various applications such as pressure sensitive adhesives, adhesives, weather seals, liquid-packaging containers, medical tools, medical tubes, etc.

The hydrogenation rate is a value calculated through $^1$H-NMR spectrometry from the carbon-carbon double bond amount in the structural unit derived from the conjugated diene compound in the polymer (B), and more detailed conditions are described in the section of Examples.
(Bonding Mode of Polymer Block (A) and Polymer Block (B))

In the hydrogenated block copolymer (a), the polymer block (A) and the polymer block (B) bond to each other but the bonding mode thereof is not specifically limited and may be any of a linear, branched or radial bonding mode, or a combination of two or more of them. Above all, the bonding mode of the polymer block (A) and the polymer block (B) is preferably linear, and examples thereof include, where the polymer block (A) is represented by A and the polymer block (B) is by B, a diblock copolymer represented by A-B, a triblock copolymer represented by A-B-A, a tetrablock copolymer represented by A-B-A-B, a pentablock copolymer represented by A-B-A-B-A, an (A-B)nX-type copolymer (where X represents a coupling agent residue and n represents an integer of 3 or more), etc. Above all, a linear triblock copolymer or diblock copolymer is preferred, and an A-B-A-type triblock copolymer is preferably used from the viewpoint of the flexibility of the resin composition containing the hydrogenated block copolymer (a) and the easiness in producing the copolymer.

Here, in this description, in the case where blocks of the same kind of polymer bond linearly via a difunctional coupling agent or the like, all the bonding polymer blocks are dealt with as one polymer block. Accordingly, including the above-mentioned exemplifications, the polymer block to be technically strictly expressed as Y-X-Y (where X represents a coupling residue) is expressed as Y as a whole except the case where it must be specifically differentiated from a single polymer block Y. In this description, the polymer block of this kind that contains a coupling agent residue is dealt with as above, and therefore, for example, a block copolymer that contains a coupling agent residue and is to be strictly expressed as A-B-X-B-A (where X represents a coupling agent residue) is expressed as A-B-A and is dealt with as an example of a triblock copolymer.

The hydrogenated block copolymer (a) may contain, within a range not detracting from the object of the present invention, a polymer block (C) of any other polymerizing monomer than those of the polymer block (A) and the polymer block (B). In this case where the polymer block (C) is represented by C, the structure of the block copolymer includes an A-B-C-type triblock copolymer, an A-B-C-A-type tetrablock copolymer, an A-B-A-C-type tetrablock copolymer, etc.

The weight average molecular weight of the hydrogenated block copolymer (a) is 150,000 to 800,000, preferably 150,000 to 600,000, more preferably 170,000 to 500,000, even more preferably 180,000 to 500,000, and most preferably 190,000 to 450,000. Having the weight average molecular weight that falls within the above range, the hydrogenated block copolymer (a) of the present invention is excellent in moldability and has a sufficient mechanical strength even though the content of the polymer block (A) therein is 1% by mass or more and less than 5% by mass, and in addition, the resin composition containing the hydrogenated block copolymer (a) can also be excellent in moldability and mechanical strength. In particular, for use for tubes such as medical tubes and the like, the weight average molecular weight of the hydrogenated block copolymer (a)

is, from the viewpoint of lowering the tube molding temperature, preferably 150,000 to 350,000, more preferably 150,000 to 300,000, even more preferably 150,000 to 260,000, still more preferably 170,000 to 260,000.

The molecular weight distribution (weight average molecular weight/number-average molecular weight) of the hydrogenated block copolymer (a) is, though not specifically limited thereto, preferably 1.0 to 1.8, more preferably 1.0 to 1.6, even more preferably 1.0 to 1.4. Having a molecular weight distribution that falls within the range, the hydrogenated block copolymer (a) is excellent in mechanical strength and, in addition, low-molecular components hardly bleed out of the molded article thereof.

So far as not detracting from the object and the effect of the present invention, the hydrogenated block copolymer (a) may have one or more kinds of functional groups such as a carboxy group, a hydroxy group, an acid anhydride group, an amino group, an epoxy group and the like, in the molecular chain and/or at the molecular terminal, or may not have a functional group.

The flowability of the hydrogenated block copolymer (a) is, from the viewpoint of bettering the moldability of the resin composition containing the hydrogenated block copolymer (a), preferably such that the melt flow rate thereof as measured at 230° C. and at 21.6 N is 0.01 to 300 g/10 min. In the case of film formation according to a T-die method or an inflation method, the melt flow rate is more preferably 0.01 to 100 g/10 min, and in the case of tube molding or injection molding according to an extrusion method, the melt flow rate is more preferably 0.1 to 100 g/10 min. In this description, "melt flow rate" is everywhere a value measured according to JIS K 7210 (1999).

(Production Method for Hydrogenated Block Copolymer (a))

The hydrogenated block copolymer (a) may be produced according to a solution polymerization method, an emulsion polymerization method, a solid-phase polymerization method or the like. Above all, a solution polymerization method is preferred, and for example, a known method of an ionic polymerization method of anionic polymerization, cationic polymerization or the like, or a radical polymerization method or the like is employable. Above all, an anionic polymerization method is preferred. In an anionic polymerization method, an aromatic vinyl compound and a conjugated diene compound are successively added to a reactor in the presence of a solvent, an anionic polymerization initiator and optionally a Lewis base therein to give a block copolymer, and optionally a coupling agent may be added to and reacted with it, and thereafter the block copolymer is hydrogenated to give the hydrogenated block copolymer (a).

In the above-mentioned method, an organic lithium compound may be used as the polymerization initiator, and examples thereof include methyl lithium, ethyl lithium, n-butyl lithium, sec-butyl lithium, tert-butyl lithium, pentyl lithium, etc. A dilithium compound may also be used as the polymerization initiator, and examples thereof include naphthalene dilithium, dilithiohexylbenzene, etc.

Examples of the coupling agent include dichloromethane, dibromomethane, dichloroethane, dibromoethane, dibromobenzene, phenyl benzoate, etc.

The amount of the polymerization initiator and the coupling agent to be used may be adequately determined depending on the desired weight average molecular weight of the intended hydrogenated block copolymer (a). In general, the initiator such as an alkyl lithium compound, a dilithium compound or the like is used preferably in a ratio of 0.01 to 0.2 parts by mass relative to 100 parts by mass of the total amount of the monomer such as an aromatic vinyl compound, butadiene, isoprene, etc. In the case where a coupling agent is used, the amount thereof to be used is preferably 0.001 to 0.8 parts by mass relative to 100 parts by mass of the total amount of the monomers.

Not specifically limited, the solvent may any one not having any negative influence on anionic polymerization, and examples thereof include aliphatic hydrocarbons such as cyclohexane, methylcyclohexane, n-hexane, n-pentane, etc.; aromatic hydrocarbons such as benzene, toluene, xylene, etc. The polymerization is carried out generally at a temperature of 0 to 100° C., preferably 10 to 70° C., for 0.5 to 50 hours, preferably 1 to 30 hours.

For controlling the total content of the 1,2-bond and the 3,4-bond in the polymer block (B) in the hydrogenated block copolymer (a) to be 30 to 85 mol % and for controlling the glass transition temperature of the polymer block (B) to be −50 to 30° C., a method of adding a Lewis base as a co-catalyst in polymerization.

Examples of the Lewis base to be employed include ethers such as dimethyl ether, diethyl ether, tetrahydrofuran, etc.; glycol ethers such as ethylene glycol dimethyl ether, diethylene glycol dimethyl ether, etc.; amines such as triethylamine, N,N,N',N'-tetramethylenediamine, N-methylmorpholine, etc. One alone or two or more kinds of these Lewis bases may be used either singly or as combined.

The amount of the Lewis base to be added may be determined depending on the intended vinyl bonding amount of the isoprene unit and/or the butadiene unit constituting the polymer block (B). Consequently, the amount of the Lewis base to be added is, though not strictly limited thereto, generally within a range of 0.1 to 1,000 mol per gram atom of lithium contained in the alkyl lithium compound or the dilithium compound to be used as the polymerization initiator, preferably within a range of 1 to 100 mol.

After polymerization according to the above-mentioned method, an active hydrogen compound such as alcohols, carboxylic acids, water or the like is added to the system to stop the polymerization reaction, and thereafter the resultant polymer is reacted for hydrogenation (hydrogenated) in the presence of a hydrogenation catalyst in an inert organic solvent. The hydrogenation may be carried out under a hydrogen pressure of 0.1 to 20 MPa, preferably 0.5 to 15 MPa, more preferably 0.5 to 5 MPa, at a reaction temperature of 20 to 250° C., preferably 50 to 180° C., more preferably 70 to 180° C., for a reaction time of generally 0.1 to 100 hours, preferably 1 to 50 hours.

Examples of the hydrogenation catalyst include Raney nickel; a heterogeneous catalyst with a metal such as Pt, Pd, Ru, Rh, Ni or the like supported by a simple substance of carbon, alumina, diatomaceous earth or the like; a Ziegler catalyst of a combination of a transition metal compound and an alkyl aluminum compound, an alkyl lithium compound or the like; a metallocene catalyst, etc.

The hydrogenated block copolymer (a) thus obtained is solidified by pouring the polymerization reaction liquid into methanol or the like, and then heated or dried under reduced pressure, or is processed for steam stripping by pouring the polymerization reaction liquid into hot water along with steam for azeotropic removal of solvent, and then heated or dried under reduced pressure, and is thereby collected.

In the hydrogenated block copolymer (a) of the present invention, the content of the polymer block (A) is extremely small, and therefore, according to the above-mentioned steam stripping method, the final product is often difficult to collect. In such a case, a solvent removal method is favorably employed, using a twin-screw multistage extruder, a twin-screw vented extruder equipped with an endless screw, or a twin-screw vented extruder equipped with a pump between the screw tip and the die part therein.

Prior to solvent removal and pelletization through an extruder, a step may be provided where the solvent is partly concentrated through flash evaporation using a flashing evaporator. The flash evaporation method is not specifically limited, and may be carried out according to an ordinary method applicable to a polymer solution. For example, there may be mentioned a method of giving heat sufficient for volatiling volatile component followed by feeding to a flash drum having a controlled pressure via a flash valve, a method feeding a polymer solution to a plate fin-type heat exchanger or a vertical multitubular heat exchanger directly connected to a flash drum, followed by heating it to foam the volatile component for preheating, or a method where in flash evaporation of volatile components from a polymer solution, the solution is given heat necessary for volatiling the volatile components and then introduced into a flash drum in which the jacket temperature in the vapor phase part is kept higher than the residual polymer solution temperature in the liquid phase part after flashing, and the jacket temperature in the liquid phase part is kept lower than the residual polymer solution temperature after flashing, thereby removing the volatile component by flash evaporation.

In addition, in the hydrogenated block copolymer (a) of the present invention, the content of the polymer block (A) is extremely small, and therefore, the agglutination of the resultant polymer may often be strong. In such a case, though not specifically limited, a method may be employed where the copolymer is mixed with a polyolefinic resin (b) to be mentioned below to form a master batch, or in pelletization, the copolymer may be co-extruded along with a polyolefinic resin (b) to be taken out as two-layered pellets with the hydrogenated block copolymer (a) as a core and the polyolefinic resin (b) as a sheath.

[Pressure-Sensitive Adhesive]

The hydrogenated block copolymer (a) of the present invention has pressure sensitive adhesiveness, and can be used as a pressure sensitive adhesive. The pressure sensitive adhesive may be the hydrogenated block copolymer (a) alone or may contain, as needed, a tackifier resin, various additives, any other resin, etc.

(Tackifier Resin)

Examples of the tackifier resin include chromane resins such as chromane-indene resins, etc.; phenolic resins and terpene resins such as p-t-butylphenol-acetylene resins, phenol-formaldehyde resins, terpene-phenol resins, polyterpene resins, xylene-formaldehyde resins, etc.; petroleum resins such as synthetic polyterpene resins, aromatic petroleum resins, aliphatic petroleum resins, alicyclic petroleum resins, aromatic petroleum resins, modified alicyclic petroleum resins, hydrocarbon tackifier resins, low molecular-weight polybutene, low-molecular-weight atactic polypropylene, etc.; rosin resins such as rosin esters as typified by rosin pentaerythritol esters, rosin glycerol esters, etc., hydrogenated rosins, hydrogenated rosin methyl esters, polymerized rosin pentaerythritol esters, hydrogenated rosin esters, high-melting-point ester resins, polymerized rosins, hardened rosins, special rosin esters, etc. Above all, terpene resins, alicyclic petroleum resins and rosin resins are preferred, and alicyclic petroleum resins are more preferred. One alone or two or more kinds of tackifier resins may be used either singly or as combined.

The softening point of the tackifier resin is preferably 85 to 160° C., more preferably 100 to 150° C., even more preferably 105 to 145° C. When the softening point of the tackifier resin is 85° C. or higher, the adhesion force at a high temperature (55° C.) tends to be good, and when 160° C. or lower, the moldability (molding workability) with the pressure sensitive adhesive tends to be good.

Commercial products may be used for the tackifier resin, and examples of commercial products include "YS Resin PX", "YS Resin PXN" (terpene resins, both manufactured by Yasuhara Chemical Co., Ltd.), "YS Polystar 2000", "Polystar U", "Polystar T", "Polystar S", "Mighty Ace G" (terpene-phenol resins, all manufactured by Yasuhara Chemical Co., Ltd.), "Alcon P100", "Alcon P125", "Alcon P140" (alicyclic hydrocarbon resins, all manufactured by Arakawa Chemical Industries Ltd.), etc.

(Additives)

As the additives, any known additives to be contained in pressure sensitive adhesives can be used with no specific limitation, and examples thereof include a heat stabilizer, a light stabilizer, a UV absorbent, an antioxidant, a lubricant, a colorant, an antistatic agent, a flame retardant, a water repellent, a waterproof agent, a hydrophilizing agent, an electroconductivity imparting agent, a thermal conductivity imparting agent, an electromagnetic wave shieldability imparting agent, a translucency controlling agent, a fluorescent brightener, a slidability imparting agent, a transparency imparting agent, an antiblocking agent, a metal inactivator, a antimicrobial agent, a softening agent, a filler, etc.

(Other Resins)

Within a range not detracting from the object of the present invention, the pressure sensitive adhesive may contain any other resin. Examples of the other resin include polyethylene or polypropylene-based polyolefinic resins; styrenic resins such as polyisoprene, polybutadiene, styrene-butadiene rubber, styrene-isoprene rubber, ethylene-propylene copolymer, ethylene-vinyl acetate copolymer, ethylene-ethyl acrylate copolymer, ethylene-(meth)acrylic acid copolymer, ethylene-(meth)acrylic acid copolymer metal ion-crosslinked resin (ionomer), polystyrene, AS resin, ABS resin, etc.; polyamide resins such as polyphenylene ether resin, nylon 6, nylon 66, etc.; polyester resins such as polyethylene terephthalate, polybutylene terephthalate, etc.; polyurethane resins; acetal resins such as polyoxymethylene homopolymer, polyoxymethylene copolymer, etc.; acrylic resins such as polymethyl methacrylate resin, etc. Further, a hydrogenated block copolymer of the hydrogenated block copolymer (a) where the content of the polymer block (A) is 5% by mass or more (for example, 5 to 20% by mass) is also employable as the other resin.

(Content of Constituent Component in Pressure-Sensitive Adhesive)

The content of the hydrogenated block copolymer (a) in the sum total of the components constituting the pressure sensitive adhesive is, from the viewpoint of reducing adhesive deposit and improving pressure sensitive adhesiveness, preferably 70% by mass or more, more preferably 80% by mass or more, even more preferably 90% by mass or more, and especially preferably 93% by mass or more.

In the case where the pressure sensitive adhesive contains a tackifier resin, the content of the tackifier resin in the sum total of the constitutive solid content is, from the viewpoint of pressure sensitive adhesiveness, preferably 1% by mass or more, more preferably 3% by mass or more. On the other hand, from the viewpoint of reducing adhesive deposit, the content is preferably 30% by mass or less, more preferably 20% by mass or less, even more preferably 10% by mass or less, and especially preferably 7% by mass or less.

In the case where the pressure sensitive adhesive contains the above-mentioned additives, the content of the additives in the sum total of the constitutive solid content is preferably 20% by mass or less, more preferably 10% by mass or less, even more preferably 5% by mass or less, and especially preferably 3% by mass or less.

In the case where the pressure sensitive adhesive contains the above-mentioned any other resin, the content of the other resin in the sum total of the constitutive solid content is preferably 20% by mass or less, more preferably 15% by mass or less.

As described above, the pressure sensitive adhesive of the present invention may be the hydrogenated block copolymer (a) alone, or may be produced by melt-kneading a resin composition prepared by mixing the hydrogenated block copolymer (a) and at least one selected from the group consisting of the above-mentioned tackifier and various additives. As the case may be, an organic solvent may be added to the resin composition prepared by mixing the hydrogenated block copolymer (a) and at least one selected from the group consisting of the above-mentioned tackifier resin and various additives, and the organic solvent may be removed from the resultant mixture to produce a pressure sensitive adhesive resin.

The temperature in melt kneading may be adequately settled, but is generally preferably 150 to 300° C., more preferably 160 to 250° C.

The organic solvent is not specifically limited so far as it is a solvent capable of dissolving the resin composition, and examples thereof include cyclohexane, methylcyclohexane, n-hexane, n-heptane, benzene, toluene, toluene-ethanol mixed solvent, xylene, ethylbenzene, tetrahydrofuran, etc. One alone or two or more kinds of organic solvents may be used either singly or as combined. From the viewpoint of easiness in coating, easiness in solution production and easiness in drying, toluene, toluene-ethanol mixed solvent, xylene or ethylbenzene is preferred. The solid concentration of the solution is, from the viewpoint of easiness in coating, easiness in solution production and easiness in drying, preferably 5 to 50% by mass, more preferably 5 to 40% by mass, even more preferably 5 to 30% by mass.

The pressure sensitive adhesive thus obtained can be applied or co-extruded onto a substrate or the like according to an ordinary method of hot melting, co-extrusion or the like and can be used as a pressure sensitive adhesive tape, a pressure sensitive adhesive film or a pressure sensitive adhesive sheet. For example, all the components of the pressure sensitive adhesive are mixed using a mixing machine such as a Henschel mixer, a V blender, a ribbon blender, a tumbler blender, a conical blender or the like, or after thus mixed, the resultant mixture is melt-kneaded with a single-screw extruder, a twin-screw extruder, a kneader or the like, and thereafter the resultant resin composition is, after formed into a melt, applied or co-extruded onto a substrate or the like, thereby producing a pressure sensitive adhesive tape, a pressure sensitive adhesive film or a pressure sensitive adhesive sheet.

In the case where an organic solvent is used, all the components of the pressure sensitive adhesive are dissolved in an organic solvent such as toluene, cyclohexane, ethyl acetate or the like, and the resultant solution is, using coater such as a reverse coater, a bar coater or the like, applied onto, for example, a release sheet, and then the organic solvent is removed by heating, and while a substrate or the like is stuck to the surface of the pressure sensitive adhesive layer on the release sheet, this is wound up to be a pressure sensitive adhesive tape, a pressure sensitive adhesive film or a pressure sensitive adhesive sheet.

Examples of the material for the substrate include, though not specifically limited thereto, polyolefins such as polyethylene, polypropylene, ethylene/propylene copolymer, etc.; ethylene/vinyl acetate copolymer, polyvinyl chloride, polyvinylidene chloride, polystyrene, polyacrylonitrile, acrylic polymer, polyester, polyurethane, polyamide, polycarbonate, polyimide, etc.

[Resin Composition]

The resin composition of a different embodiment of the present invention contains the above-mentioned hydrogenated block copolymer (a) as the component (a) and a polyolefinic resin as the component (b) in a specific content ratio as mentioned below.

The components that the resin composition contains are described below.

(Component (b): Polyolefinic Resin)

Containing a polyolefinic resin [hereinafter referred to as a polyolefinic resin (b)], the moldability of the resin composition of the present invention is mainly improved.

The olefin that constitute the polyolefinic resin (b) is preferably an olefin having 2 to 10 carbon atoms, more preferably an olefin having 2 to 8 carbon atoms, even more preferably an olefin having 2 to 5 carbon atoms, and especially preferably an olefin having 2 to 4 carbon atoms. Examples of the olefin include ethylene, propylene, 1-butene, 1-pentene, 1-hexene, 1-octene, 4-methyl-1-pentene, cyclohexene, etc. The olefin to constitute the polyolefinic resin (b) may be one type alone or may be two types or more. Among these, ethylene, propylene and 1-butene are preferred, and propylene is more preferred.

In particular, the polyolefinic resin (b) is preferably a polypropylenic resin, and is more preferably a polypropylenic resin in which the content of the structural unit derived from propylene (propylene monomer unit) is 60 mol % or more, and with no specific limitation except it, any known polypropylenic resin is employable. The content of the propylene monomer unit is more preferably 70 mol % or more, even more preferably 80 mol to 100 mol %, still more preferably 90 to 100 mol %, especially preferably 93 to 99 mol %, and most preferably 95 to 99 mol %. Examples of the structural unit derived from any others than propylene include a structural unit derived from ethylene, a structural unit derived from an α-olefin such as 1-butene, 1-hexene, 1-heptene, 1-octene, 4-methyl-1-pentene, 1-nonene, 1-decene or the like, as well as a structural unit derived from a modifier to be mentioned below, etc.

Examples of the polyolefinic resin (b), especially the polypropylenic resin include homopolypropylene, propylene-ethylene random copolymer, propylene-ethylene block copolymer, propylene-butene random copolymer, propylene-propylene-ethylene-butene random copolymer, propylene-pentene random copolymer, propylene-hexane random copolymer, propylene-octene random copolymer, propylene-ethylene-pentene random copolymer, propylene-ethylene-hexene random copolymer, etc. In addition, a modified polypropylenic resin prepared by graft-copolymerizing the polypropylenic resin with a modifier, for example, an unsaturated monocarboxylic acid such as acrylic acid, methacrylic acid, crotonic acid, etc.; an unsaturated dicarboxylic acid such as maleic acid, citraconic acid, itaconic acid, etc.; an ester, an amide or an imide of the unsaturated monocarboxylic acid or the unsaturated dicarboxylic acid; an unsaturated dicarboxylic acid anhydride such as maleic anhydride, citraconic anhydride, itaconic anhydride or the like (hereinafter this may be referred to as a polar group-having polypropylenic resin) may also be used.

As described above, the polyolefinic resin (b) may be a polar group-having polyolefinic resin. Examples of the polar group include a (meth)acryloyloxy group, a hydroxy group, an amide group, a halogen atom, a carboxy group, an ester group represented by —C(=O)OR or —OC(=O)R (where R represents an alkyl group having 1 to 10 carbon atoms or an aryl group having 6 to 20 carbon atoms, preferably an alkyl group having 1 to 5 carbon atoms or an aryl group having 6 to 10 carbon atoms), an acid anhydride group, etc. Among these, as the polar group, from the viewpoint of improving adhesion force, a (meth)acryloyloxy group, a carboxy group, an ester group and an acid anhydride group are preferred, and a carboxy group and an acid anhydride group are more preferred. Containing a polar group-having polyolefinic polymer, the resin composition of the present invention has both adequate flexibility and moldability and, even though not processed for primer treatment or the like, it can be adhered to ceramics, metals, resins and the like by heat treatment at low temperatures, and further, in a peel test, the fracture morphology thereof is a cohesion failure, that is, the composition exhibits strong adhesiveness, and is therefore useful as an adhesive.

The production method for the polar group-containing polyolefinic resin is not specifically limited, and the resin can be produced according to a known method of random copolymerization, block copolymerization or graft copolymerization of an olefin and a polar group-containing copolymerizing monomer. Among these, random copolymerization or graft copolymerization is preferred, and a graft copolymer is more preferred. Apart from these, the resin may also be obtained by reaction of oxidation, chlorination or the like of a polyolefinic resin according to a known method. In addition, the resin may be produced by modifying a commercially-available polyolefin with a polar group-containing compound.

Examples of the polar group-containing copolymerizing monomer include vinyl acetate, vinyl chloride, ethylene oxide, propylene oxide, acrylamide, unsaturated carboxylic acid, and ester or acid anhydride thereof. Above all, an unsaturated carboxylic acid or an ester or acid anhydride thereof is preferred. Examples of the unsaturated carboxylic acid or an ester or acid anhydride thereof include (meth)acrylic acid, (meth)acrylate, maleic acid, maleic anhydride, fumaric acid, itaconic acid, itaconic anhydride, himic acid, himic anhydride, etc. Above all, maleic acid and maleic anhydride are more preferred.

As the polyolefinic resin (b), homopolypropylene, propylene-ethylene random copolymer, propylene-ethylene block copolymer and propylene-butene random copolymer are preferred from the viewpoint of easy availability at relatively low cost, homopolypropylene and propylene-ethylene random copolymer are more preferred, and propylene-ethylene random copolymer is more preferred. Especially for use as an adhesive and in the case where the adhesive is used for a polar group-having adherend, a polar group-containing polyolefinic resin is preferred, a polar group-containing polypropylenic resin is more preferred, and a polar group-having propylene-ethylene random copolymer is even more preferred, and in particular, those where the polar group is a carboxy group or an acid anhydride group are preferred, and a maleic acid-modified polypropylenic resin and a maleic anhydride-modified polypropylenic resin are more preferred. On the other hand, for use as an adhesive and in the case where the adhesive is used for a non-polar adherend, or for other uses, a polyolefinic resin not having a polar group is preferred though not specifically limited, and a polypropylenic resin not having a polar group is more preferred.

One alone or two or more kinds of polyolefinic resins (b) may be used either singly or as combined.

The melt flow rate (MFR) of the polyolefinic resin (b), as measured at 230° C. under 21.6 N, is, from the viewpoint of the moldability of the resin composition, preferably 0.1 to 200 g/10 min, more preferably 0.3 to 100 g/10 min, even more preferably 0.5 to 30 g/10 min.

The melting point of the polyolefinic resin (b) is, though not specifically limited, preferably 120 to 180° C., more preferably 120 to 170° C.

The content ratio of the hydrogenated block copolymer (a) and the polyolefinic resin (b) is, when the hydrogenated block copolymer (a) is represented by (a) and the polyolefinic resin (b) is by (b), preferably (a)/(b) by mass of 1/99 to 99/1, more preferably 5/95 to 95/5. When the content of the hydrogenated copolymer (a) is less than 1% by mass, the transparency and the flexibility of the resin composition are insufficient, but when more than 99% by mass, the mechanical strength and the moldability of the resin composition are insufficient unfavorably. In consideration of the balance of film moldability, flexibility and tensile properties, (a)/(b) by mass is more preferably 10/90 to 50/50, even more preferably 15/85 to 50/50.

Depending on use, the desired flexibility, hardness, mechanical strength and transparency differ, and therefore a preferred mass ratio differs, but in general, for hard members such as a port, a cap, a bottle or a syringe barrel of an infusion bag or a blood bag, the ratio is preferably 1/99 to 50/50, for a film member such as a liquid-packaging container of an infusion bag or a blood bag, the ratio is preferably 5/95 to 70/30, more preferably 5/95 to 45/55, and for a soft member of a medical tube or a medical stopper of an infusion tube, a catheter or the like, the ratio is preferably 50/50 to 99/1. For use that requires moldability (for example, injection moldability, extrusion moldability), the ratio is preferably 20/80 to 80/20, more preferably 30/70 to 70/30.

In the case where a polypropylenic resin is used as the polyolefinic resin (b), the resin composition of the present invention may further contain an α-olefin copolymer (c). Specifically, the α-olefin copolymer (c) includes an ethylene-α-olefin copolymer, a propylene-α-olefin copolymer, etc.

In the case where an ethylene-α-olefin copolymer is used as the α-olefin copolymer (c), the content of the structural unit derived from an ethylene monomer (hereinafter this may be abbreviated as an ethylene content) may be 50 to 95 mol % with no specific limitation, and any known ethylene-α-olefin copolymer may be used. In the case where a propylene-α-olefin copolymer is used as the α-olefin copolymer (c), the content of the structural unit derived from a propylene monomer (hereinafter this may be abbreviated as a propylene content) may be 10 to 80 mol % with no specific limitation, and any known propylene-α-olefin copolymer may be used.

Examples of the ethylene-α-olefin copolymer (c) include an ethylene-propylene copolymer (having an ethylene content of 50 mol % or more), an ethylene-1-butene copolymer, an ethylene-1-hexene copolymer, an ethylene-1-heptene copolymer, an ethylene-1-octene copolymer, an ethylene-4-methyl-1-pentene copolymer, an ethylene-1-nonene copolymer, an ethylene-1-decene copolymer, etc., and modified derivatives thereof, etc. The modified derivatives include those prepared by graft-copolymerizing the copolymer with a modifier, and those prepared by copolymerizing the copolymer with a modifier at the main chain thereof. Examples of the modifier include unsaturated dicarboxylic acids such as maleic acid, citraconic acid, halogenomaleic acid, itaconic acid, cis-4-cyclohexene-1,2-dicarboxylic acid, endo-cis-bicyclo[2.2.1]-5-heptene-2,3-dicarboxylic acid, etc.; esters, amides or imides of unsaturated dicarboxylic acids; unsaturated dicarboxylic acid anhydrides such as maleic anhydride, citraconic anhydride, halogenomaleic anhydride, itaconic anhydride, anhydrous cis-4-cyclohexene-1,2-dicarboxylic acid, anhydrous endo-cis-bicyclo [2.2.1]-5-heptene-2,3-dicarboxylic acid, etc.; unsaturated monocarboxylic acids such as acrylic acid, methacrylic acid, crotonic acid, etc.; esters of unsaturated monocarboxylic acids (methyl acrylate, ethyl acrylate, methyl methacrylate, ethyl methacrylate, etc.), amides or imides thereof etc. As the ethylene-α-olefin copolymer (3), unmodified ones are preferred.

Examples of the propylene-α-olefin copolymer (c) include a propylene-ethylene copolymer (having an ethylene content of less than 50 mol %), a propylene-1-butene copolymer, a propylene-1-hexene copolymer, a propylene-1-heptene copolymer, a propylene-1-octene copolymer, a propylene-4-methyl-1-pentene copolymer, a propylene-1-nonene copolymer, a propylene-1-decene copolymer, etc., and modified derivatives thereof, etc. The modified derivatives include those prepared by graft-copolymerizing the copolymer with a modifier, and those prepared by copolymerizing the copolymer with a modifier at the main chain thereof. Examples of the modifier include unsaturated dicarboxylic acids such as maleic acid, citraconic acid, halogenomaleic acid, itaconic acid, cis-4-cyclohexene-1,2-dicarboxylic acid, endo-cis-bicyclo[2.2.1]-5-heptene-2,3-dicarboxylic acid, etc.; esters, amides or imides of unsaturated dicarboxylic acids; unsaturated dicarboxylic acid anhydrides such as maleic anhydride, citraconic anhydride, halogenomaleic anhydride, itaconic anhydride, anhydrous cis-4-cyclohexene-1,2-dicarboxylic acid, anhydrous endo-cis-bicyclo[2.2.1]-5-heptene-2,3-dicarboxylic acid, etc.; unsaturated monocarboxylic acids such as acrylic acid, methacrylic acid, crotonic acid, etc.; esters of unsaturated monocarboxylic acids (methyl acrylate, ethyl acrylate, methyl methacrylate, ethyl methacrylate, etc.), amides or imides thereof etc. As the propylene-α-olefin copolymer (3), unmodified ones are preferred.

Above all, from the viewpoint of availability with ease at low cost, an ethylene-propylene copolymer, an ethylene-1-butene copolymer, an ethylene-1-octene copolymer, a propylene-ethylene copolymer, a propylene-1-butene copolymer and a propylene-1-octene copolymer are preferred.

The melt flow rate of the α-olefin copolymer (c), as measured at 230° C. under 21.6 N, is, from the viewpoint of the moldability of the resin composition (X), preferably 0.1 to 30 g/10 min, more preferably 1 to 20 g/10 min, even more preferably 1 to 10 g/10 min.

The melting point of the α-olefin copolymer (c) is, though not specifically limited, preferably 40 to 120° C., more preferably 40 to 105° C.

One alone or two or more kinds of α-olefin copolymers (c) may be used either singly or as combined.

In the case where the resin composition of the present invention contains an α-olefin copolymer (c), the content thereof is preferably 5 to 40 parts by mass relative to 100 parts by mass of the sum total of the components (a) to (c), more preferably 5 to 25 parts by mass, even more preferably 5 to 20 parts by mass.

Within a range not detracting from the object of the present invention, the resin composition may contain any other polymer and oligomer than the above-mentioned ones. The polymer includes styrenic resins such as polyisoprene, polybutadiene, styrene-butadiene rubber, styrene-isoprene rubber, polyethylene, ethylene-vinyl acetate copolymer, ethylene-ethyl acrylate copolymer, ethylene-(meth)acrylic acid copolymer, ethylene-(meth)acrylic acid copolymer metal ion-crosslinked resin (ionomer), polystyrene, AS resin, ABS resin, etc.; polyamide resins such as polyphenylene ether resin, nylon 6, nylon 66, etc.; polyester resins such as polyethylene terephthalate, polybutylene terephthalate, etc.; polyurethane resins; acetal resins such as polyoxymethylene homopolymer, polyoxymethylene copolymer, etc.; acrylic resins such as polymethyl methacrylate resin, etc.; tackifier resins such as rosin resins, terpene-phenol resins, terpene resins, aromatic hydrocarbon-modified terpene resins, aliphatic petroleum resins, alicyclic petroleum resins, aromatic petroleum resins, chromane-indene resins, phenolic resins, xylene resins, etc.; hydrogenated block copolymers of the above-mentioned hydrogenated block copolymers (a) where the content of the polymer block (A) is 5% by mass or more (for example, 5 to 20% by mass), etc. From the viewpoint of preventing contamination owing to bleeding of the constituent components, the resin composition of the present invention preferably does not contain a softening agent except for the case of using the composition for applications requiring high moldability such as applications for weather seal, etc.

Within a range not interfering with the object of the present invention, an inorganic filler may be added to the resin composition of the present invention.

Examples of the inorganic filler include talc, clay, mica, calcium silicate, calcium carbonate, magnesium carbonate, aluminum hydroxide, magnesium hydroxide, calcium hydroxide, silica alumina, titanium oxide, iron oxide, zinc oxide, magnesium oxide, etc. From the viewpoint of transparency and safety, the resin composition of the present invention preferably does not contain an inorganic filler, but in the case where an inorganic filler is added to the composition for the purpose of reducing agglutination performance, for improving mechanical strength and from the viewpoint of economic performance, the amount thereof to be added is preferably 20 parts by mass or less relative to 100 parts by mass of the total of the hydrogenated block copolymer (a) and the polyolefinic resin (b), more preferably 10 parts by mass or less.

Within a range not interfering with the object of the present invention, the resin composition of the present invention may contain, as needed, any other additive. Examples of the additive include a working heat stabilizer, a light stabilizer, a UV absorbent, an antioxidant, a lubricant, a colorant, an antistatic agent, a flame retardant, a water repellent, a waterproof agent, a hydrophilicity imparting agent, an electroconductivity imparting agent, a thermal conductivity imparting agent, an electromagnetic wave shieldability imparting agent, a translucency controlling agent, a fluorescent brightener, a slidability imparting agent, a transparency imparting agent, an antiblocking agent, a metal inactivator, a antimicrobial agent, etc. Examples of the working heat stabilizer include a phosphorus-containing working heat stabilizer, a lactone-based working heat stabilizer, a hydroxy-containing working heat stabilizer, etc. Among these, a lactone-based working heat stabilizer is preferred, and the content thereof is, from the viewpoint of the safety of the resultant resin composition, preferably 3 parts by mass or less relative to 100 parts by mass of the total of the hydrogenated block copolymer (a) and the polyolefinic resin (b), more preferably 2 parts by mass or less.
(Production Method for Resin Composition)

The resin composition of the present invention can be produced by mixing the hydrogenated block copolymer (a), the polyolefinic resin (b) and optional other components, using a mixing machine such as a Henschel mixer, a V blender, a ribbon blender, a tumbler blender, a conical blender or the like, or after the mixing, by melt-kneading the resultant mixture with a single-screw extruder, a twin-screw extruder, a kneader or the like. The temperature in melt kneading may be settled adequately, but is, in general, preferably 150 to 300° C., more preferably 180 to 250° C.

Thus obtained, the resin composition can be molded into films, sheets, fibrous molded articles, tubes and the like, according to any molding method of injection molding, blow molding, pressure molding, extrusion molding, calender molding, etc.

[Use]

As containing the hydrogenated block copolymer (a) of the present invention, the resin composition of the present invention can give molded articles excellent in flexibility, kink resistance, transparency, moldability, pressure sensitive adhesiveness, adhesiveness and weather resistance. Though an accurate reason why the resin composition of the present invention can have such excellent properties is unclear, it may be presumed that, as shown in FIG. 1 and FIG. 2, the degree of fine dispersion of the hydrogenated block copolymer (a) and the polyolefinic resin (b) becomes finer (FIG. 1), and owing to it, various properties of the composition could be improved. In addition, the resin composition of the present invention can give a molded article having sufficient mechanical strength and heat resistance. Consequently, the medical tool formed of the resin composition of the present invention is resistant to autoclave sterilization and therefore does not require any sterilization method using an ethylene oxide gas (EOG), that is, the composition is free from a problem caused by residual EOG. In addition, a sterilization method of γ-ray sterilization or the like is applicable to the medical tool formed of the resin composition of the present invention. Further, the resin composition of the present invention gives a molded article having good biocompatibility. Specific examples of medical tools formed of the resin composition of the present invention are mentioned below.

Making use of the above-mentioned properties, the resin composition of the present invention can be used as a protective film, a medical film favorable for liquid-packaging containers such as blood bags, infusion bags, etc. The liquid-packaging container produced using the resin composition of the present invention is excellent in transparency, breaking strength at room temperature and breaking strength at low temperature (hereinafter referred to as low-temperature breaking strength), and the crack propagation morphology thereof is a preferred one, and consequently, the reliability thereof as a liquid-packaging container for medical use is high. Accordingly, the present invention also provides a liquid-packaging container that contains a layer formed of the resin composition of the present invention.

The liquid-packaging container (medical film) may be a single-layer film formed of one alone of the resin composition of the present invention, or may be a multilayer film formed by combining two or more layers as laminated, in which every layer may have a different formulation. In the case of a multilayer film, more specifically, a liquid-packaging container of a laminate of at least three layers of an inner layer, a middle layer and an outer layer is preferred, in which at least one layer of the inner layer, the middle layer and the outer layer is formed of the resin composition of the present invention. More preferably, in the liquid-packaging container, at least the inner layer is formed of the resin composition of the present invention, and even more preferably, in the liquid-packaging container, all the layers of the inner layer, the middle layer and the outer layer are formed of the resin composition of the present invention. In any layer, the constituent components of the resin composition to be used and the content thereof may differ, or may be the same. A liquid-packaging container where the inner layer and the middle layer contains the above-mentioned components (a) to (c) and the outer layer contains the above-mentioned components (a) and (b) is preferred, and a liquid-packaging container where the inner layer contains the component (a) and a hydrogenated block copolymer except the component (a) and the middle layer and the outer layer contain the component (a) and the component (b) is more preferred.

As one embodiment of the present invention, a liquid-packaging container formed of a laminate of at least three layers of an inner layer, a middle layer and an outer layer is preferred, wherein:

both the inner layer and the middle layer or any one layer of the inner layer or the middle layer is formed of the resin composition or the present invention, and wherein:

the melting point $MP_{in}$ of the resin component constituting the inner layer and the melting point $MP_{mid}$ of the resin component constituting the middle layer satisfy the following expression:

$$MP_{in} < MP_{mid}.$$

As another embodiment of the present invention, a liquid-packaging container formed of a laminate of at least three layers of an inner layer, a middle layer and an outer layer is also preferred, wherein:

the inner layer is formed of the resin composition of the present invention, and wherein:

the melting point $MP_{in}$ of the resin component constituting the inner layer and the melting point $MP_{out}$ of the resin component constituting the outer layer satisfy the following expression:

$$0 < MP_{out} - MP_{in} \leq 50$$

The thickness of each layer of the liquid-packaging container is not specifically limited, and may be adequately settled depending on the intended use. For example, the thickness of the inner layer is preferably 5 to 30 μm, more preferably 10 to 30 μm. The thickness of the middle layer is preferably 100 to 300 μm, more preferably 100 to 200 μm, even more preferably 100 to 180 μm. The thickness of the outer layer is preferably 15 to 120 μm, more preferably 15 to 80 μm, even more preferably 15 to 70 μm.

In the multilayer film, the layer formed of the resin composition of the present invention may be a single layer of any of an innermost layer, a middle layer and an outermost layer, depending on the desired performance to be given, or may be plural layers. In addition, the layer may be laminated with a layer of any other polymer. The other layer includes an adhesive layer, a protective layer, a coating layer, a light-reflective layer, a gas-barrier layer, a light-absorbent layer, etc. The other polymer includes an olefinic polymer such as polypropylene, polyethylene, ethylene-propylene copolymer rubber (EPM), ethylene-vinyl alcohol copolymer (EVOH), ethylene-propylene-conjugated diene copolymer rubber (EPDM), etc.; a polyester polymer such as polyester elastomer, polyethylene terephthalate, polybutylene terephthalate, etc.; a polyamide resin such as polyamide 6, polyamide 6.6, polyamide 6.10, polyamide 11, polyamide 12, polyamide 6.12, etc.; an acrylic resin such as polymethyl acrylate, polymethyl methacrylate, etc.; a polyoxymethylene resin such as polyoxymethylene homopolymer, polyoxymethylene copolymer, etc.; a styrenic resin such as styrene homopolymer, acrylonitrile-styrene resin, acrylonitrile-butadiene-styrene resin, etc.; a polycarbonate resin; a styrenic elastomer and a hydrogenated or modified derivative thereof such as styrene-butadiene copolymer rubber, styrene-isoprene copolymer rubber, etc.; a natural rubber; a synthetic isoprene rubber, a liquid polyisoprene rubber and a hydrogenated or modified derivative thereof; a chloroprene rubber; an acryl rubber; a butyl rubber; an acrylonitrile-butadiene rubber; an epichlorohydrin rubber; a silicone rubber, a fluorine rubber; a chlorosulfonated polyethylene; an urethane rubber; a polyurethane elastomer; a polyamide elastomer; a polyester elastomer; a soft polyvinyl chloride resin, etc.

(Production Method for Liquid-Packaging Container)

The production method for the liquid-packaging container using a film having at least a layer formed of the resin composition of the present invention is not specifically limited, but is, for example, the following method is preferred. First, the resin composition to be a material for each layer is kneaded using a kneading machine such as a single-screw extruder, a twin-screw extruder, a kneader, a Banbury mixer, a roll or the like. The resultant resin composition is formed into a film, a sheet, a tube or the like through coextrusion molding using a multilayer T-die, an air-cooling or water-cooling inflation molding using a multilayer circular T-die or the like. The resin temperature in molding is preferably 150 to 300° C., more preferably 180 to 250° C. The cooling temperature in air-cooling or water-cooling inflation molding is preferably 7 to 70° C., more preferably 10 to 40° C. From the viewpoint of easy production and sanitary aspect of the liquid-packaging container, the resin composition is preferably molded into a film or a tube. A tubular molded article may be, after heat-sealed, cut off (cut out) to easily produce a liquid-packaging container. Subsequently, in the case of medical use, the container may be sterilized. Having a port for liquid injection and a cap with a rubber stopper for liquid take out, the container can be effectively used as a medial tool such as an infusion bag, etc.

In addition, making use of the above-mentioned properties, the resin composition of the present invention can be used as a medical tube favorable for an extension tube for an infusion set or a blood giving set, a gastral tube or catheter, a respiratory tube or catheter, an urinary tube or catheter, a blood vessel tube or catheter, an IVR (less-invasive intravascular treatment) catheter, etc.

The medical tube may be a single-layer tube using one alone of the resin composition of the present invention, or a multilayer tube of plural layers as combined in which each layer may differ in the formulation. In the multilayer tube, the layer formed of the resin composition of the present invention may be a single layer of any of an innermost layer, a middle layer and an outermost layer, depending on the desired performance to be given, or may be plural layers. In addition, the layer may be laminated with a layer of any other polymer. Specific examples of the other layer and specific examples of the other applicable polymer may be the same as those exemplified hereinabove for the above-mentioned multilayer film.

Making use of the properties thereof as mentioned above, the resin composition of the present invention is also usable as medical tools such as a rubber stopper for drugs and medicines, a packing for containers, a syringe, an artificial dialyzer, a blood component separator, an artificial lung, a wound covering material, etc.; a hygiene product such as a sanitary product, a paper diaper, etc.; a surgical gown, a disposable sheet for hospitals, etc. It is not necessary that all parts of these medical tools are formed of the resin composition of the present invention.

(Weather Seal)

The hardness (JIS-A) of the resin composition of the present invention, measured according to the method described in the section of Examples, is 30 to 90, precisely 50 to 80, and therefore the resin composition is excellent in weather resistance and moldability (injection moldability), and has suitable flexibility, weather resistance and moldability necessary for weather seals. Further, the resin composition is excellent in adhesion force to vulcanized rubber and TPV generally used as a material for weather seals, and is, from this viewpoint, useful as a weather seal, especially as a corner member of a weather seal. Among weather seals, the resin composition is especially useful as a corner member for glass runs, and a corner member for door seals, etc. In addition, the resin composition is also useful as a strip material and a mole material for automobiles.

As a specific example of a resin composition useful as weather seals, for example, a resin composition containing (I) an olefinic rubber, (II) the hydrogenated block copolymer (a) of the present invention, (III) a polyolefinic resin and (IV) a softening agent is preferred.

The components of the resin composition useful as weather seals are described below.

((I) Olefinic Rubber)

The olefinic rubber (hereinafter referred to as an olefinic rubber (I)) includes:

(I-1) a copolymer rubber of ethylene and one or more α-olefins having 3 to 20 carbon atoms (hereinafter this may be referred to as "ethylene/α-olefin copolymer rubber") and a crosslinked product thereof, (I-2) a copolymer rubber of ethylene, one or more α-olefins having 3 to 20 carbon atoms, and one or more non-conjugated polyenes (hereinafter this may be referred to as "ethylene/α-olefin/non-conjugated diene copolymer rubber) and a crosslinked product thereof, etc.

One alone or two or more kinds of olefinic rubbers (I) may be used either singly or as combined.

In the case of using two or more kinds as combined, it is preferable to use the above-mentioned crosslinked ethylene/α-olefin copolymer rubber and the above-mentioned crosslinked ethylene/α-olefin/non-conjugated polyene copolymer rubber as combined.

Above all, as the olefinic rubber (I), a crosslinked ethylene/α-olefin/non-conjugated polyene is preferred as bettering strain recovery at high temperature.

Examples of the α-olefin having 3 to 20 carbon atoms to constitute the copolymer rubber or a crosslinked product thereof include propylene, 1-butene, 1-pentene, 1-hexene, 1-heptene, 1-octene, 1-decene, etc. One alone or two or more of these α-olefins may be used either singly or as combined. Above all, at least one selected from the group consisting of propylene, 1-butene, 1-hexene and 1-octene is preferred, at least one selected from the group consisting of propylene and 1-butene is more preferred, and propylene is even more preferred.

In the ethylene/α-olefin copolymer rubber, the molar ratio of ethylene and the α-olefin having 3 to 20 carbon atoms (ethylene/α-olefin with 3 to 20 carbon atoms) is, from the viewpoint of maintaining good balance of mechanical strength and high-temperature strain recovery, preferably 40/60 to 93/7, more preferably 50/50 to 85/15, even more preferably 60/40 to 80/20.

Examples of the non-conjugated polyene to constitute the ethylene/α-olefin/non-conjugated polyene copolymer rubber include cyclic polyenes such as 5-ethylidene-2-norbornene, dicyclopentadiene, 5-propylidene-2-norbornene, 5-vinyl-2-norbornene, 2,5-norbornadiene, 1,4-cyclohexadiene, 1,4-cyclooctadiene, 1,5-cyclooctadiene, etc.; linear polyenes having an internal unsaturated bond and having 6 to 15 carbon atoms, such as 1,4-hexadiene, 4-methyl-1,4-hexadiene, 5-methyl-1,4-hexadiene, 5-methyl-1,5-heptadiene, 6-methyl-1,5-heptadiene, 6-methyl-1,6-octadiene, 7-methyl-1,6-octadiene, 5,7-dimethyl-1,6-octadiene, 7-methyl-1,7-nonadiene, 8-methyl-1,7-nonadiene, 8-methyl-1,8-decadiene, 9-methyl-1,8-decadiene, 4-ethylidene-1,6-octadiene, 7-methyl-4-ethylidene-1,6-octadiene, 7-methyl-4-ethylidene-1,6-nonadiene, 7-ethyl-4-ethylidene-1,6-nonadiene, 6,7-dimethyl-4-ethylidene-1,6-octadiene, 6,7-dimethyl-4-ethylidene-1,6-nonadiene, etc.; α,ω-dienes such as 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, etc.

Above all, cyclic polyenes and linear polyenes having an internal unsaturated bond and having 6 to 15 carbon atoms are preferred; at least one selected from the group consisting of 5-ethylidene-2-norbornene, dicyclopentadiene, 5-vinyl-2-norbornene, 5-methyl-1,4-hexadiene and 7-methyl-1,6-octadiene is more preferred; and from the viewpoint of excellent reactivity with a crosslinking agent, at least one selected from the group consisting of 5-ethylidene-2-norbornene, dicyclopentadiene and 5-vinyl-2-norbornene is even more preferred.

In the ethylene/α-olefin/non-conjugated polyene copolymer rubber, the molar ratio of ethylene to the α-olefin having 3 to 20 carbon atoms and the non-conjugated polyene [ethylene/(α-olefin with 3 to 20 carbon atoms and non-conjugated polyene)] is, from the viewpoint of flexibility and rubber elasticity, preferably 90/10 to 40/60, more preferably 80/20 to 50/50.

The iodine value of the ethylene/α-olefin/non-conjugated polyene copolymer rubber (iodine value before crosslinked) is, from the viewpoint of mechanical strength and rubber elasticity, preferably 3 to 40, more preferably 5 to 25, even more preferably 5 to 15. When the iodine value is 3 or more, the mechanical strength of the molded article obtained from the thermoplastic elastomer composition tends to better, and when the iodine value is 40 or less, the rubber elasticity of the thermoplastic elastomer composition tends to be not lost. The "iodine value" as referred to in this description is an iodine value measured according to the method described in JIS K1525.

The Mooney viscosity (ML 1+4, 100° C.) of the olefinic rubber (I) is, from the viewpoint of molding workability and mechanical strength, preferably 25 to 350, more preferably 40 to 300, even more preferably 60 to 150.

The "Mooney viscosity (ML 1+4, 100° C.)" as referred to in this description is a viscosity measured according to the method described in JIS K6300 (2013).

The olefinic rubber (I) may be a previously-crosslinked one, and though not specifically limited, the crosslinking degree thereof is, from the viewpoint of high-temperature strain recovery, preferably such that, in Soxhlet extraction for 10 hours of the crosslinked olefinic rubber (I) using cyclohexane, the mass ratio of the gel not dissolved in cyclohexane but remaining as it is (gel fraction) is 80% or more relative to the mass of the crosslinked olefinic rubber before extraction treatment, more preferably 95% or more.

The crosslinking agent and the crosslinking aid to be used in the crosslinking reaction may be the same as those to be mentioned below.

((III) Polyolefinic Resin)

Examples of the polyolefinic resin of the component (III) [hereinafter referred to as polyolefinic resin (III)] include ethylenic polymer, propylenic polymer, poly(1-butene), poly(4-methyl-1-pentene), etc. One alone or two or more kinds of polyolefinic resins (III) may be used either singly or as combined. Above all, from the viewpoint of injection moldability, at least one selected from an ethylenic polymer and a propylenic polymer is preferred, and a propylenic polymer is more preferred.

Here, the ethylenic polymer is a polymer having a content of the structural unit derived from ethylene (hereinafter this may be abbreviated as an ethylene content) of 60 mol % or more, and the ethylene content is preferably 70 mol % or more, more preferably 80 mol % or more. The propylenic polymer is a polymer having a content of the structural unit derived from propylene (hereinafter this may be abbreviated as an propylene content) of 60 mol % or more, and the propylene content is preferably 70 mol % or more, more preferably 80 mol % or more, and even more preferably 90 mol % or more.

Examples of the polyethylenic resin include ethylene homopolymers such as high-density polyethylene, middle-density polyethylene, low-density polyethylene, etc.; ethylenic copolymers such as ethylene/1-butene copolymer, ethylene/hexene copolymer, ethylene/heptene copolymer, ethylene/octene copolymer, ethylene/4-methylpentene-1 copolymer, ethylene/vinyl acetate copolymer, ethylene/acrylic acid copolymer, ethylene/acrylate copolymer, ethylene/methacrylic acid copolymer, ethylene/methacrylate copolymer, etc. Above all, at least one selected from the group consisting of high-density polyethylene, middle-density polyethylene and low-density polyethylene is preferred.

Examples of the polypropylenic resin include propylene homopolymer, ethylene/propylene random copolymer, ethylene/propylene block copolymer, propylene/butene-1 copolymer, propylene/ethylene/butene-1 copolymer, propylene/4-methylpentene-1 copolymer, etc. Above all, from the viewpoint of molding workability, at least one selected from the group consisting of propylene homopolymer, ethylene/propylene random copolymer and ethylene/propylene block copolymer is preferred.

The melt flow rate (MFR) of the polyolefinic resin (III), as measured at 230° C. under 2.16 kg, is, from the viewpoint of molding workability, preferably 0.1 g/10 min or more, more preferably 0.1 to 50 g/10 min, even more preferably 1 to 40 g/10 min, still more preferably 5 to 40 g/10 min. The MFR is a value measured according to JIS K7210 (1999).

The content of the polyolefinic resin (III) is preferably 10 to 200 parts by mass relative to 100 parts by mass of the sum total of the resin composition, more preferably 10 to 100 parts by mass, even more preferably 15 to 60 parts by mass, still more preferably 20 to 40 parts by mass.

((IV) Softening Agent)

Examples of the softening agent of the component (IV) (hereinafter referred to as softening agent (IV)) include petroleum process oil such as paraffinic process oil, napthenic process oil, etc.; aromatic process oil; phthalic acid derivatives such as dioctyl phthalate, dibutyl phthalate, etc.; white oil; mineral oil; vegetable oil-type softening agent such as peanut oil, rosin, etc.; liquid paraffin; synthetic softening agents such as ethylene/α-olefin liquid cooligomer, liquid polybutene, liquid polybutadiene, liquid polyisoprene, liquid polyisoprene/butadiene copolymer, liquid styrene/butadiene copolymer, liquid styrene/isoprene copolymer, etc.

As the softening agent (IV), in particular, a softening agent having a kinematic viscosity at 40° C. of 20 to 800 mm$^2$/s (preferably 40 to 600 mm$^2$/s, more preferably 60 to 400 mm$^2$/s, even more preferably 60 to 200 mm$^2$/s, still more preferably 70 to 120 mm$^2$/s) is preferred. The kinematic viscosity is a value measured according to JIS K 2283 (2000).

The pour point of the softening agent (IV) is preferably −40 to 0° C., more preferably −30 to 0° C. The flash point of softening agent (IV) (COC method) is preferably 200 to 400° C., more preferably 250 to 350° C.

As the softening agent (IV), petroleum process oil, ethylene/α-olefin liquid cooligomer and liquid paraffin are preferred, petroleum process oil is more preferred, and paraffinic process oil is more preferred.

One alone or two or more kinds of softening agents (IV) may be used either singly or as combined.

As the softening agent (IV), for example, paraffinic process oil and naphthenic process oil (preferably paraffinic process oil) of commercial products with a trade name "Diana Process Oil" series sold by Idemitsu Kosan Co., Ltd. and the like are usable.

The content of the softening agent (IV) may be 5 to 200 parts by mass relative to 100 parts by mass of the sum total of the resin composition, and is preferably 5 to 100 parts by mass, more preferably 5 to 50 parts by mass, even more preferably 5 to 25 parts by mass.

(Crosslinking Agent (V))

Further, the composition may contain a crosslinking agent as the component (V) (hereinafter referred to as crosslinking agent (V)). Examples of the crosslinking agent (IV) include a radical generator, sulfur, a sulfur compound, etc.

Examples of the radical generator include organic peroxides, such as dialkyl monoperoxides such as dicumyl peroxide, di-t-butyl peroxide, t-butylcumyl peroxide, etc.; diperoxides such as 2,5-dimethyl-2,5-di(t-butylperoxy)hexane, 2,5-dimethyl-2,5-di(t-butylperoxy)hexyne-3, 1,3-bis(t-butylperoxyisopropyl)benzene, 1,1-bis(t-butylperoxy)-3,3,5-trimethylcyclohexane, n-butyl 4,4-bis(t-butylperoxy)valerate, etc.; diacyl peroxides such as benzoyl peroxide, p-chlorobenzoyl peroxide, 2,4-dichlorobenzoyl peroxide, etc.; monoacylalkyl peroxides such as t-butylperoxy benzoate, etc.; percarbonates such as t-butylperoxyisopropyl carbonate, etc.; diacyl peroxides such as diacetyl peroxide, lauroyl peroxide, etc. One alone or two or more kinds of these may be used either singly or as combined. Above all, 2,5-dimethyl-2,5-di(t-butylperoxy)hexane and dicumyl peroxide are preferred from the viewpoint of reactivity.

In the case where a radical generator is used, the content thereof is preferably 0.01 to 15 parts by mass relative to 100 parts by mass of the sum total of the resin composition, more preferably 0.05 to 10 parts by mass.

Examples of the sulfur compound include sulfur monochloride, sulfur dichloride, etc.

In the case where sulfur or a sulfur compound is used, the content thereof is preferably 0.1 to 20 parts by mass relative to 100 parts by mass of the sum total of the resin composition, more preferably 0.5 to 10 parts by mass, even more preferably 1 to 10 parts by mass.

As the crosslinking agent (V), in addition, a phenolic resin such as an alkylphenol resin, a bromoalkylphenol resin, etc.; or a combination of p-quinone dioxime and lead dioxide, a combination of p,p'-dibenzoylquinone dioxime and trilead tetroxide, or the like can also be used.

(Crosslinking Aid (VI))

Further, the resin composition may contain a crosslinking aid as the component (VI) [hereinafter referred to as crosslinking aid (VI)]. As the crosslinking aid (VI), any known crosslinking aid can be used. For example, there are mentioned monofunctional monomers such as trimethylolpropane trimethacrylate, trimethylolpropane triacrylate, triallyl trimellitate, triallyl 1,2,4-benzenetricarboxylate, triallyl isocyanurate, 1,6-hexanediol dimethacrylate, 1,9-nonanediol dimethacrylate, 1,10-decanediol dimethacrylate, polyethylene glycol dimethacrylate, ethylene glycol dimethacrylate, diethylene glycol dimethacrylate, triethylene glycol dimethacrylate, divinylbenzene, glycerol dimethacrylate, 2-hydroxy-3-acryloyloxypropyl methacrylate, etc.; stannous chloride, ferric chloride, organic sulfonic acids, polychloroprene, chlorosulfonated polyethylene, etc. Above all, triallyl isocyanurate is preferred.

One alone or two or more kinds of crosslinking aids (VI) can be used either singly or as combined.

In the case where a crosslinking aid (VI) is used, the content thereof is preferably 0.1 to 40 parts by mass relative to 100 parts by mass of the sum total of the resin composition, more preferably 0.5 to 20 parts by mass, even more preferably 2 to 10 parts by mass.

(Crosslinking Promoter (VII))

Further, the resin composition may contain a crosslinking promoter as the component (VII) (hereinafter referred to as crosslinking promoter (VII)). Examples of the crosslinking promoter (VII) include thiazoles such as N,N-diisopropyl-2-benzothiazole sulfenamide, 2-mercaptobenzothiazole, 2-(4-morpholinodithio)benzothiazole, etc.; guanidines such as diphenylguanidine, triphenylguanidine, etc.; aldehyde-amine reaction products or aldehyde-ammonia reaction products such as butylaldehyde-aniline reaction product, hexamethylenetetramine-acetaldehyde reaction product, etc.; imidazolines such as 2-mercaptoimidazoline, etc.; thioureas such as thiocarbanilide, diethylurea, dibutylthiourea, trimethylthiourea, di-ortho-tolylthiourea, etc.; dibenzothiazyl disulfide; thiuram monosulfides or thiuram polysulfides such as tetramethylthiuram monosulfide, tetramethylthiuram disulfide, pentamethylenethiuram tetrasulfide, etc.; thiocarbamates such as zinc dimethyldithiocarbamate, zinc ethylphenyldithiocarbamate, sodium dimethyldithiocarbamate, selenium dimethyldithiocarbamate, tellurium diethyldithiocarbamate, etc.; xanthogenates such as zinc dibutylxanthogenate, etc.; zinc oxide, etc. One alone or two or more kinds of crosslinking promoters (VII) may be used either singly or as combined.

[Other Components]

The resin composition of the present invention may further contain any other thermoplastic polymer. Examples of the other thermoplastic polymer include polyphenylene ether resins; polyamide resins such as polyamide 6, polyamide 6.6, polyamide 6.10, polyamide 11, polyamide 12, polyamide 6.12, polyhexamethylenediamine terephthalamide, polyhexamethylenediamine isophthalamide, xylene group-containing polyamide, etc.; polyester resins such as polyethylene terephthalate, polybutylene terephthalate, etc.; acrylic resins such as polymethyl acrylate, polymethyl methacrylate, etc.; polyoxymethylene resins such as polyoxymethylene homopolymer, polyoxymethylene copolymer, etc.; styrene resins such as styrene homopolymer, acrylonitrile-styrene resin, acrylonitrile-butadiene-styrene resin, etc.; polycarbonate resins; styrene elastomers and hydrogenates thereof or modified derivatives thereof (but excepting liquid ones) such as styrene/butadiene copolymer rubber, styrene/isoprene copolymer rubber, etc.; natural rubbers; chloroprene rubbers; acryl rubbers; acrylonitrile/butadiene rubbers; epichlorohydrin rubbers; silicone rubbers; chlorosulfonated polyethylenes; urethane rubbers; polyurethane elastomers; polyamide elastomers; polyester elastomers; soft polyvinyl chloride resins, etc.

Within a range not detracting from the advantageous effects of the present invention, the resin composition of the present invention may further contain various additives. Examples of the additives include a lubricant, a foaming agent, a nucleating agent, an antioxidant, a heat stabilizer, a lightproof agent, a weatherproof agent, a metal inactivator, a UV absorbent, a light stabilizer, a copper inhibitor, a filler, a reinforcing agent, an antistatic agent, an antimicrobial agent, an antifungal agent, a dispersant, a colorant, etc. One alone or two or more kinds of these may be contained either singly or as combined.

Above all, a lubricant is preferred as having an effect of improving the flowability of the resin composition and an effect of preventing thermal degradation. Examples of the lubricant include silicone oils; hydrocarbon lubricants such as paraffin wax, microcrystalline wax, polyethylene wax, etc.; butyl stearate, stearic acid monoglyceride, pentaerythritol tetrastearate, stearyl stearate, unsaturated fatty acid monoamides, etc. One alone or two or more kinds of these may be used either singly or as combined.

In the case where a lubricant is used, the content thereof is preferably 0.01 to 3 parts by mass relative to 100 parts by mass of the resin composition except lubricant, more preferably 0.05 to 1 part by mass, even more preferably 0.1 to 0.8 parts by mass.

A foaming agent may be used in production of weather seals. Examples of the foaming agent include inorganic foaming agents such as ammonium carbonate, ammonium hydrogencarbonate, sodium hydrogencarbonate, ammonium nitrite, sodium borohydride, azides, etc.; organic foaming agents, such as N-nitroso compounds such as N,N'-dinitrosopentamethylenetetramine, N,N'-dimethyl-N,N'-dinitrosoterephthalamide, etc.; azo compounds such as azobisisobutyronitrile, azodicarbonamide, barium azodicarboxylate, etc.; fluoroalkanes such as trichloromonofluoromethane, dichloromonofluoromethane, etc.; sulfonylhydrazine compounds such as paratoluenesulfonyl hydrazide, diphenylsulfone-3,3'-disulfonyl hydrazide, 4,4'-oxybis(benzensulfonylhydrazide), allylbis(sulfonylhydrazide), etc.; sulfonylsemicarbazide compounds such as p-toluylenesulfonylsemicarbazide, 4,4'-oxybis(benzenesulfonylsemicarbazide), etc.; triazole compounds such as 5-morpholyl-1,2,3,4-thiatriazole, etc.; thermal expansible fine particles of a thermal expansible compound such as isobutene, pentane or the like encapsulated in microcapsules of a thermoplastic resin of vinylidene chloride, acrylonitrile, acrylate, methacrylate or the like. One alone or two or more kinds of these may be used either singly or as combined.

In the case where a weather seal is in the form of a foamed article as above, it may optionally contain a nucleating agent, as necessary. Examples of the nucleating agent include metal oxides, composite oxides, metal carbonates, metal sulfates, metal hydrooxides and the like, such as talc, silica, alumina, mica, titania, zinc oxide, zeolite, calcium carbonate, magnesium carbonate, barium sulfate, aluminum hydroxide, etc. Using a nucleating agent tends to readily control the cell diameter of the foam cells of the foamed article, therefore facilitating production of foamed articles having suitable flexibility.

In this description, even when specific combinations are not clearly described, preferred definitions may be combined with other definitions, and a combination of preferred definitions is more preferred.

EXAMPLES

The present invention is described more concretely with reference to Examples and others, but the present invention is not whatsoever restricted by these Examples. The physical properties in Examples and Comparative Examples were measured and evaluated according to the methods mentioned below.

[Method for Measurement and Evaluation]
<(1) Weight-Average Molecular Weight (Mw) and Molecular Weight Distribution (Mw/Mn) of Various Hydrogenated Block Copolymers and Hydrogenated Copolymers (x-1), and Weight Average Molecular Weight (Mw) of Polymer Block (A) [Table 2]>

The weight average molecular weight of the hydrogenated block copolymer and the hydrogenated copolymer (x-1) obtained in Production Examples were analyzed through gel permeation chromatography (GPC) to determine the standard polystyrene-equivalent weight average molecular weight thereof.

Apparatus: GPC apparatus "HLC-8020" (manufactured by Tosoh Corporation)
Separation columns: "TSKgel GMHXL", "G4000HXL" and "G5000HXL", all manufactured by Tosoh Corporation, were serially concatenated.
Eluent: tetrahydrofuran
Eluent flow rate: 1.0 ml/min
Column temperature: 40° C.
Detection method: differential refractive index (RI)
The weight average molecular weight of the polymer block (A) was determined by sampling the liquid every time after polymerization to give the polymer block in the production process, followed by analyzing the sample.

<(2) Content of Polymer Block (A) and Hydrogenation Rate of Polymer Block (B) in Various Hydrogenated Block Copolymers and Hydrogenated Copolymers (x-1) [Table 2]>

The data were measured through $^1$H-NMR.
Apparatus: nuclear magnetic resonator "ADVANCE 400 Nano Bay" (manufactured by Bruker Corporation)
Solvent: deuterated chloroform <(3) Vinyl Bond Amount (Total Content of 1,2-Bond and 3,4-Bond) in Polymer Block (B) in Various Hydrogenated Block Copolymers and Hydrogenated Copolymers (x-1) [Table 2]>

The block copolymer or copolymer before hydrogenation was analyzed through $^1$H-NMR, in which the proportion of the peak area of 1,2-bond and 3,4-bond to the total of the peak area of 1,2-bond and 3,4-bond and the peak area of 1,4-bond was calculated to be the vinyl bond amount.

[Raw Materials Used]
Hydrogenated Block Copolymers (a), (a')
The hydrogenated block copolymers (a-1) to (a-11) and (a'-1) to (a'-6) obtained in the following Production Examples 1 to 17 were used.
Hydrogenated Copolymer (x)
The hydrogenated conjugated diene polymer (x-1) obtained in the following Production Example 18 was used.
Hydrogenated Block Copolymer (y)
The hydrogenated block copolymer (y-1) obtained in the following Production Example 19 was used.

Polyolefinic Resin (b)

Polypropylenic resin (b-1): propylenic random copolymer ["F327" (trade name), manufactured by Prime Polymer Co., Ltd., MFR=7 g/10 min (230° C., 21.2 N), melting point 145° C.]

Polypropylenic resin (b-2): propylenic random copolymer ["Purell RP373R" (trade name), manufactured by Lyondell Basell Industries Corporation, MFR=25 g/10 min (230° C., 21.2 N), melting point 150° C.]

Production Example 1

50 kg of a solvent, cyclohexane, and 20 g of an anionic polymerization initiator, 10.5 mass % cyclohexane solution of sec-butyl lithium (sec-butyl lithium content 2.1 g) were put in a nitrogen-purged and dried pressure tight container, and 280 g of a Lewis base, tetrahydrofuran was put thereinto. This was heated up to 50° C., and thereafter 0.16 kg of styrene (1) was added and polymerized for 1 hour, then sampled for molecular weight determination, and subsequently a mixture of 4.35 kg of isoprene and 3.45 kg of butadiene was added and polymerized for 2 hours, then sampled for molecular weight determination, and further 0.16 kg of styrene (2) was added and polymerized for 1 hour to give a reaction liquid containing polystyrene-poly(isoprene/butadiene)-polystyrene triblock copolymer.

A hydrogenation catalyst, palladium carbon (amount of supported palladium: 5% by mass) was added to the reaction liquid in an amount of 10% by mass relative to the block copolymer, and reacted under a hydrogen pressure of 2 MPa and at 150° C. for 10 hours.

After cooling and pressure discharge, the palladium carbon was removed by filtration, and the filtrate was concentrated and further dried in vacuum to give a hydrogenated polystyrene-poly(isoprene/butadiene)-polystyrene triblock copolymer (hereinafter referred to as "hydrogenated block copolymer (a-1)"). The amount of each component and reagent used are summarized in Table 1-1. The results of measurement of the physical properties of the hydrogenated block copolymer (a-1) are shown in Table 2.

Production Example 2

A hydrogenated block copolymer (a-2) was produced according to the same operation as in Production Example 1 except that a mixture of 4.35 kg of isoprene and 3.45 kg of butadiene was added and polymerized for 2 hours, then sampled for molecular weight determination, and a coupling agent of methyl benzoate was added and coupled for 1 hour to give a reaction liquid containing a block copolymer. The results of measurement of the physical properties of the hydrogenated block copolymer (a-2) are shown in Table 2.

Production Example 3 to Production Example 17

Hydrogenated block copolymers (a-3) to (a-11) and (a'-1) to (a'-6) were produced in the same manner as in Production Example 1 except that the amount of each component and reagent to be used was changed as in Table 1-1 or Table 1-2. The results of measurement of the physical properties of the hydrogenated block copolymers (a-3) to (a-11) and (a'-1) to (a'-6) are shown in Table 2.

Production Example 18

A hydrogenated conjugated diene copolymer (x-1) (hereinafter referred to as hydrogenated copolymer (x-1)) was produced in the same manner as in Production Example 1 except that styrene was not used as the monomer. The results of measurement of the physical properties of the hydrogenated copolymer (x-1) are shown in Table 2.

Production Example 19

A hydrogenated block copolymer (y-1) was produced in the same manner as in Production Example 1 except that the amount of each component and reagent to be used was changed as in Table 1-2. The results of measurement of the physical properties of the hydrogenated block copolymer (y-1) are shown in Table 2.

TABLE 1-1

| Hydrogenated Block Copolymer (a) | | Production Example 1 a-1 | Production Example 2 a-2 | Production Example 3 a-3 | Production Example 4 a-4 | Production Example 5 a-5 | Production Example 6 a-6 | Production Example 7 a-7 | Production Example 8 a-8 | Production Example 9 a-9 | Production Example 10 a-10 |
|---|---|---|---|---|---|---|---|---|---|---|---|
| Amount Used (kg) | Cyclohexane | 50.0 | 50.0 | 50.0 | 50.0 | 50.0 | 50.0 | 50.0 | 50.0 | 50.0 | 50.0 |
| | Sec-butyl lithium | 0.020 | 0.040 | 0.020 | 0.020 | 0.084 | 0.061 | 0.072 | 0.084 | 0.078 | 0.007 |
| | Styrene (1) | 0.16 | 0.33 | 0.33 | 0.16 | 0.56 | 0.37 | 0.48 | 0.32 | 0.47 | 0.09 |
| | Styrene (2) | 0.16 | — | — | 0.16 | 0.07 | 0.10 | 0.30 | 0.32 | — | 0.09 |
| | Isoprene | 4.35 | 4.35 | 4.35 | — | 8.44 | 8.52 | 8.36 | 8.44 | 8.52 | 2.32 |
| | Butadiene (1) | 3.45 | 3.45 | 3.45 | 7.80 | 6.70 | 6.77 | 6.64 | 6.70 | 6.77 | 1.84 |
| Lewis base | Tetrahydrofuran | 0.29 | 0.29 | 0.29 | — | 0.29 | 0.31 | 0.31 | 0.31 | 0.31 | 0.31 |
| | TMEDA*[1] | — | — | — | 0.006 | — | — | — | — | — | — |
| Coupling agent | Methyl benzoate | — | 0.003 | — | — | — | — | — | — | — | — |

TABLE 1-2

| Hydrogenated block copolymer (a'), others | | Production Example 12 a'-1 | Production Example 13 a'-2 | Production Example 14 a'-3 | Production Example 15 a'-4 | Production Example 16 a'-5 | Production Example 17 a'-6 | Production Example 18 x-1 | Production Example 19 y-1 |
|---|---|---|---|---|---|---|---|---|---|
| Amount Used (kg) | Cyclohexane | 50.0 | 50.0 | 50.0 | 50.0 | 50.0 | 50.0 | 50.0 | 50.0 |
| | Sec-butyl lithium | 0.048 | 0.085 | 0.096 | 0.020 | 0.020 | 0.076 | 0.020 | 0.166 |
| | Styrene (1) | 0.44 | 0.63 | 0.95 | 0.16 | 0.16 | 0.50 | — | 1.5 |

TABLE 1-2-continued

| Hydrogenated block copolymer (a'), others | Production Example 12 a'-1 | Production Example 13 a'-2 | Production Example 14 a'-3 | Production Example 15 a'-4 | Production Example 16 a'-5 | Production Example 17 a'-6 | Production Example 18 x-1 | Production Example 19 y-1 |
|---|---|---|---|---|---|---|---|---|
| Styrene (2) | 0.44 | 0.63 | 0.95 | 0.16 | 0.16 | 1.50 | — | 1.5 |
| Isoprene | 6.47 | 8.08 | — | 4.35 | 4.35 | 8.20 | 4.35 | 13.6 |
| Butadiene (1) | 5.14 | 6.42 | 13.87 | 3.45 | 3.45 | 6.50 | 3.45 | — |
| Lewis base | | | | | | | | |
| Tetrahydrofuran | 0.30 | 0.31 | — | 0.03 | 0.29 | 0.31 | 0.29 | — |
| TMEDA*1 | — | — | 0.031 | — | — | — | — | — |
| Coupling agent | | | | | | | | |
| Methyl benzoate | — | — | — | — | — | — | — | — |

[Description of Note in Table 1]
*1: Tetramethylethylenediamine, manufactured by Wako Pure Chemical Industries, Ltd.

TABLE 2

| | Hydrogenated Block Copolymer (a), (a'), others | | Molecular Weight Distribution (Mw/Mn) | Polymer Block (A) | | Polymer Block (B) | |
|---|---|---|---|---|---|---|---|
| | | Total Mw | | Content of Polymer Block (A) (mass %) | Total Mw of polymer block (A) | Isoprene/ Butadiene (mass ratio) | Hydrogenation Rate (mol %) |
| Production Example 1 | a-1 | 370,000 | 1.2 | 4.0 | 10,000 | 55/45 | 92 |
| Production Example 2 | a-2 | 370,000 | 1.2 | 4.0 | 10,000 | 55/45 | 92 |
| Production Example 3 | a-3 | 370,000 | 1.2 | 4.0 | 10,000 | 55/45 | 92 |
| Production Example 4 | a-4 | 420,000 | 1.3 | 4.0 | 10,000 | 0/100 | 99 |
| Production Example 5 | a-5 | 175,000 | 1.1 | 4.0 | 4,600 | 55/45 | 92 |
| Production Example 6 | a-6 | 240,000 | 1.1 | 3.0 | 4,700 | 55/45 | 92 |
| Production Example 7 | a-7 | 195,000 | 1.1 | 4.9 | 6,500 | 55/45 | 92 |
| Production Example 8 | a-8 | 175,000 | 1.1 | 4.0 | 4,600 | 55/45 | 92 |
| Production Example 9 | a-9 | 180,000 | 1.1 | 3.0 | 3,700 | 55/45 | 92 |
| Production Example 10 | a-10 | 560,000 | 1.3 | 4.0 | 15,000 | 55/45 | 92 |
| Production Example 11 | a-11 | 195,000 | 1.1 | 4.9 | 6,600 | 55/45 | 92 |
| Production Example 12 | a'-1 | 210,000 | 1.1 | 7.0 | 11,000 | 55/45 | 92 |
| Production Example 13 | a'-2 | 155,000 | 1.1 | 8.0 | 9,000 | 55/45 | 92 |
| Production Example 14 | a'-3 | 165,000 | 1.1 | 12.0 | 12,000 | 0/100 | 99 |
| Production Example 15 | a'-4 | 370,000 | 1.2 | 4.0 | 10,000 | 55/45 | 92 |
| Production Example 16 | a'-5 | 370,000 | 1.2 | 4.0 | 10,000 | 55/45 | 70 |
| Production Example 17 | a'-6 | 219,000 | 1.1 | 12.0 | 16,000 | 55/45 | 92 |
| Production Example 18 | x-1 | 360,000 | 1.2 | 0 | 0 | 55/45 | 92 |
| Production Example 19 | y-1 | 178,000 | 1.1 | 18.0 | 5,500 | 11,000 100/0 | 100/0  4 | 99 |

Examples 1 to 12 and Comparative Examples 1 to 9: Film Production

According to the formulation and the blending ratio shown in Table 3 below, the hydrogenated block copolymer (a) or (a') or the hydrogenated copolymer, and the polyolefinic resin (b) were melt-kneaded with a single screw at a resin temperature of 230° C. to produce a resin composition. Here, the phase separation structure of the resin compositions obtained in Example 1 and Comparative Example 6 was confirmed with a transmission electron microscope. The results are shown in FIG. 1 and FIG. 2. It is known that the resin composition obtained in Example 1 was more finely dispersed.

Next, using a water-cooling downward inflation molding machine, the resin composition was molded at a resin temperature of 200° C., at a cooling water temperature of 20° C., and at a line speed of 10 m/min to give a single-layer film having a thickness of 200 jam. The physical properties of the resultant film were measured according to the methods mentioned below. The results are shown in Table 3.

<(4) Film Moldability>

The film moldability was evaluated by surging of the resultant film (in molding, the extrusion amount could not be constant, and the shape and the dimension of the product were uneven or were varied regularly) and by the amount of foreign substances and fish eyes to form owing to kneading failure, based on the following evaluation criteria, and the result was considered to be an index of film moldability.

A: In both directions of MD and TD of the film cut by 2 m in a direction of MD, the thickness accuracy was less than ±10%, and neither foreign substances nor fish eyes were confirmed in visual observation.

B: In at least one direction of MD and TD of the film cut by 2 m in a direction of MD, the thickness accuracy was ±10% or more, and some foreign substances and fish eyes were confirmed in visual observation.

<(5) Flexibility (Young's Modulus)>

A specimen having a size of 25 mm×75 mm was prepared, and using "Instron 3345" (manufactured by Instron Corporation), the Young's modulus thereof was measured at 5 mm/min. Those having a small value are more excellent in flexibility. A value of 255 MPa or less is preferred, and a value of 170 MPa or less is more preferred.

<(6) Tensile Property>

Using "Instron 3345" (manufactured by Instron Corporation), the single-layer film having a thickness of 200 μm produced in Examples and Comparative Examples was tested according to a method of JIS K 6251 (1993) at a pulling speed of 50 mm/min to measure the tensile breaking strength in a direction of MD, which is referred to as an index of mechanical property. The tensile breaking strength of the film is preferably 17 MPa or more, more preferably 27 MPa or more, even more preferably 30 MPa or more.

TABLE 3

| | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 |
| | Hydrogenated Block Copolymer (a) | | | | | | | | | | | | | |
| Resin Composition/ mass part | | a-1 | 30 | | | | | | | | | | 65 |
| | | a-2 | | 30 | | | | | | | | | |
| | | a-3 | | | 30 | | | | | | | | |
| | | a-4 | | | | 30 | | | | | | | |
| | | a-5 | | | | | 30 | | | | | | |
| | | a-6 | | | | | | 30 | | | | | |
| | | a-7 | | | | | | | 30 | | | | |
| | | a-8 | | | | | | | | 30 | | | |
| | | a-9 | | | | | | | | | 30 | | |
| | | a-10 | | | | | | | | | | 30 | |
| | Hydrogenated Block Copolymer (a') | | | | | | | | | | | | | |
| | | a'-1 | | | | | | | | | | | |
| | | a'-2 | | | | | | | | | | | |
| | | a'-3 | | | | | | | | | | | |
| | | a'-4 | | | | | | | | | | | |
| | | a'-5 | | | | | | | | | | | |
| | | a'-6 | | | | | | | | | | | |
| | Hydrogenated Copolymer (x) | | | | | | | | | | | | | |
| | | x-1 | | | | | | | | | | | |
| | Polyolefinic Resin(b) | | | | | | | | | | | | | |
| | | b-1 (MFR = 7 g/10 min) | 70 | 70 | 70 | 70 | 70 | 70 | 70 | 70 | 70 | 70 | 35 |
| | | b-2 (MFR = 25 g/10 min) | | | | | | | | | | | |
| Physical Properties | | Film Moldability | A | A | A | A | A | A | A | A | A | A | B |
| | | Flexibility (MPa) | 146 | 149 | 142 | 155 | 160 | 144 | 165 | 166 | 151 | 155 | 18 |
| | | Tensile Property (breaking strength: MPa) | 34.4 | 33.2 | 33.3 | 34.7 | 30.1 | 30.5 | 31.0 | 27.8 | 24.1 | 34.0 | 17.5 |

| | | | Example | Comparative Example | | | | | | | | |
|---|---|---|---|---|---|---|---|---|---|---|---|---|
| | | | 12 | 1 | 2 | 3 | 4 | 5 | 6 | 7 | 8 | 9 |
| | Hydrogenated Block Copolymer (a) | | | | | | | | | | | |
| Resin Composition/ mass part | | a-1 | 10 | | | | | | | | | |
| | | a-2 | | | | | | | | | | |
| | | a-3 | | | | | | | | | | |
| | | a-4 | | | | | | | | | | |
| | | a-5 | | | | | | | | | | |
| | | a-6 | | | | | | | | | | |

TABLE 3-continued

| | | 1 | 2 | 3 | 4 | 5 | 6 | 7 | 8 | 9 | 10 |
|---|---|---|---|---|---|---|---|---|---|---|---|
| | a-7 | | | | | | | | | | |
| | a-8 | | | | | | | | | | |
| | a-9 | | | | | | | | | | |
| | a-10 | | | | | | | | | | |
| | Hydrogenated Block Copolymer (a') | | | | | | | | | | |
| | a'-1 | 30 | | | | | | | | 65 | 10 |
| | a'-2 | | 30 | | | | | | | | |
| | a'-3 | | | 30 | | | | | | | |
| | a'-4 | | | | 30 | | | | | | |
| | a'-5 | | | | | 30 | | | | | |
| | a'-6 | | | | | | 30 | | | | |
| | Hydrogenated Copolymer (x) | | | | | | | | | | |
| | x-1 | | | | | | | | 30 | | |
| | Polyolefinic Resin(b) | | | | | | | | | | |
| | b-1 (MFR = 7 g/10 min) | 90 | 70 | 70 | 70 | 70 | 70 | 70 | 70 | 35 | 90 |
| | b-2 (MFR = 25 g/10 min) | | | | | | | | | | |
| Physical Properties | Film Moldability | A | A | A | A | B | B | A | — | B | A |
| | Flexibility (MPa) | 250 | 183 | 207 | 229 | 302 | 288 | 190 | — | 22 | 402 |
| | Tensile Property (breaking strength: MPa) | 39.3 | 35.6 | 31.3 | 31.6 | 30.2 | 30.4 | 34.6 | — | 18.2 | 38.5 |

From the results in Table 3, the film of the resin composition using any of hydrogenated block copolymers (a-1) to (a-10) has excellent film moldability and flexibility and is excellent in tensile property. In consideration of the balance of all the film moldability, flexibility and tensile property, it may be said that the content ratio of hydrogenated block copolymer (a) to polyolefinic resin (b) [(a)/(b)] is preferably 15/85 to 50/50 by mass.

On the other hand, the film of the resin composition using any of the hydrogenated block copolymers (a'-1) to (a'-3) or (a'-6) where the content of the polymer block (A) is more than 5% by mass is poor in flexibility (Comparative Examples 1 to 3 and 6). The film of the resin composition using the hydrogenated block copolymer (a'-4) having a vinyl bond amount of less than 30 mol % or using (a'-5) having a hydrogenation rate of less than 80 mol % is poor in film moldability and flexibility (Comparative Examples 4 and 5). In the case where the hydrogenated polymer (x-1) not containing the polymer block (A) is used, the hydrogenated copolymer (x-1) could not be uniformly premixed since it was semisolid, and therefore a film having a predetermined blending ratio could not be produced (Comparative Example 7).

Examples 13 to 23 and Comparative Examples 10 to 15: Tube Production

According to the formulation and the blending ratio shown in Table 4 below, the hydrogenated block copolymer (a) or (a') or the hydrogenated copolymer (x), and the polyolefinic resin (b) were melt-kneaded with twin screws at a resin temperature of 230° C. to produce a resin composition. Next, using a single-screw extruder and a tube die, the resultant resin composition was molded at the temperature shown in Table 4 whereupon the moldability was confirmed, and then rapidly cooled in a cooling bath at a water temperature of 25° C. to produce a tube having an inner diameter of 3 mm and an outer diameter of 4 mm. The resultant tube was measured or evaluated according to the following methods. The results are shown in Table 4.

<(7) Tube Moldability>

The tube moldability was evaluated by the fact whether or not the tube molded using a single-screw extruder at the temperature shown in Table 4 could be could be taken out, according to the evaluation criteria shown below, and it was considered to be an index of tube moldability.

A: The molded article having come out through the horizontal die was taken out with no problem, and tube molding ended with success.

B: In taking out the molded article having come out through the horizontal die, it cut and tube molding could not be attained, but through a downward water-cooling die, tube molding was possible.

C: In any case of using a horizontal die or a downward water-cooling die, the molded article cut while taken out, and tube molding was impossible.

<(8) Kink Resistance>

The tube having a total length of 20 cm (outer diameter 40 mm, inner diameter 30 mm, wall thickness 0.5 mm) obtained in Examples and Comparative Examples was deformed circularly at 25° C., whereupon the minimum bending diameter just before kinking was measured and was considered to be an index of kink resistance. A smaller value indicates more excellent kink resistance, and a value of 16 mm or less is preferred, and 13 mm or less is more preferred.

<(9) Melt Tension>

Using a melt tensiometer of Capillograph (manufactured by Toyo Seiki Co., Ltd.), the resin composition was preheated at the same temperature as the molding temperature shown in Table 4 in a cylinder (160° C., 220° C. or 230° C.) for 5 minutes, and then ejected to the capillary (φ1 mm, L/D=10) at a speed of 10 mm/min via a piston, and the resultant strand was taken out at a constant speed of 20 m/min. Along the way, the load was read on a stress gauge via a pulley and recorded, and the data read within 10 seconds after the load curve became stable after the start of the measurement were averaged to give a mean value as a melt tension. A larger melt tension is preferred since the strand is hardly cut. A melt tension of 0.001 N or more is preferred. 0.002 N or more is more preferred, and 0.003 N or more is even more preferred.

TABLE 4

|  |  | Example |  |  |  |  |  |  |  |  |
|---|---|---|---|---|---|---|---|---|---|---|
|  |  | 13 | 14 | 15 | 16 | 17 | 18 | 19 | 20 | 21 |
| Resin Composition/ mass part | Hydrogenated Block Copolymer (a) |  |  |  |  |  |  |  |  |  |
|  | a-1 | 65 |  |  |  |  |  |  | 55 | 13 |
|  | a-2 |  |  |  |  |  |  |  |  |  |
|  | a-3 |  |  |  |  |  |  |  |  |  |
|  | a-4 |  |  |  |  |  |  |  |  |  |
|  | a-5 |  | 65 |  |  |  |  |  |  |  |
|  | a-6 |  |  | 65 |  |  |  |  |  |  |
|  | a-7 |  |  |  | 65 |  |  |  |  |  |
|  | a-8 |  |  |  |  | 65 |  |  |  | 52 |
|  | a-9 |  |  |  |  |  | 65 |  |  |  |
|  | a-10 |  |  |  |  |  |  | 65 |  |  |
|  | Hydrogenated Block Copolymer (a') |  |  |  |  |  |  |  |  |  |
|  | a'-1 |  |  |  |  |  |  |  |  |  |
|  | a'-2 |  |  |  |  |  |  |  |  |  |
|  | a'-3 |  |  |  |  |  |  |  |  |  |
|  | a'-4 |  |  |  |  |  |  |  |  |  |
|  | a'-5 |  |  |  |  |  |  |  |  |  |
|  | a'-6 |  |  |  |  |  |  |  |  |  |
|  | Hydrogenated Copolymer (x) |  |  |  |  |  |  |  |  |  |
|  | x-1 |  |  |  |  |  |  |  |  |  |
|  | Polyolefinic Resin(b) |  |  |  |  |  |  |  |  |  |
|  | b-1 (MFR = 7 g/10 min) |  |  |  |  |  |  |  |  |  |
|  | b-2 (MFR = 25 g/10 min) | 35 | 35 | 35 | 35 | 35 | 35 | 35 | 45 | 35 |
| Physical Properties | Tube Moldability | A | A | A | A | B | B | B | A | A |
|  | Molding Temperature (° C.) | 220 | 160 | 160 | 160 | 160 | 160 | 230 | 220 | 160 |
|  | Kink Resistance (mm) | 11 | 10 | 9 | 12 | 12 | 9 | 12 | 15 | 12 |
|  | Melt Tension (N) | 0.006 | 0.003 | 0.003 | 0.003 | 0.002 | 0.001 | 0.008 | 0.003 | 0.006 |

|  |  | Example |  | Comparative Example |  |  |  |  |  |
|---|---|---|---|---|---|---|---|---|---|
|  |  | 22 | 23 | 10 | 11 | 12 | 13 | 14 | 15 |
| Resin Composition/ mass part | Hydrogenated Block Copolymer (a) |  |  |  |  |  |  |  |  |
|  | a-1 |  | 13 |  |  |  |  |  |  |
|  | a-2 |  |  |  |  |  |  |  |  |
|  | a-3 |  |  |  |  |  |  |  |  |
|  | a-4 |  |  |  |  |  |  |  |  |
|  | a-5 |  |  |  |  |  |  |  |  |
|  | a-6 |  |  |  |  |  |  |  |  |
|  | a-7 |  |  |  |  |  |  |  |  |
|  | a-8 | 52 |  |  |  |  |  |  |  |
|  | a-9 |  | 52 |  |  |  |  |  |  |
|  | a-10 |  |  |  |  |  |  |  |  |
|  | Hydrogenated Block Copolymer (a') |  |  |  |  |  |  |  |  |
|  | a'-1 |  |  | 65 |  |  |  | 55 |  |
|  | a'-2 |  |  |  | 65 |  |  |  |  |
|  | a'-3 |  |  |  |  | 65 |  |  |  |
|  | a'-4 |  |  |  |  |  |  |  |  |
|  | a'-5 |  |  |  |  |  |  |  |  |
|  | a'-6 | 13 |  |  |  |  |  | 65 |  |
|  | Hydrogenated Copolymer (x) |  |  |  |  |  |  |  |  |
|  | x-1 |  |  |  |  |  | 65 |  |  |
|  | Polyolefinic Resin(b) |  |  |  |  |  |  |  |  |
|  | b-1 (MFR = 7 g/10 min) |  |  |  |  |  |  |  |  |
|  | b-2 (MFR = 25 g/10 min) | 35 | 35 | 35 | 35 | 35 | 35 | 35 | 45 |
| Physical Properties | Tube Moldability | A | A | A | A | A | C | A | A |
|  | Molding Temperature (° C.) | 160 | 160 | 200 | 170 | 170 | 160 | 170 | 200 |
|  | Kink Resistance (mm) | 13 | 10 | 15 | 15 | 20 | — | 18 | 18 |
|  | Melt Tension (N) | 0.005 | 0.004 | 0.007 | 0.004 | 0.012 | less than 0.001 | 0.018 | 0.004 |

From the results in Table 4, the tube of the resin composition using any of hydrogenated block copolymers (a-1) and (a-5) to (a-10) has excellent kink resistance and is excellent in tube moldability. Further, in the case of using the hydrogenated block copolymers (a-1), and (a-5) to (a-7), the melt tension is also good (Examples 13 to 16). In addition, by additionally using the hydrogenated block copolymer (a), the results are that the tube moldability is good, the molding temperature is low and the kink resistance and melt tension are good (Examples 21 and 23). Also in the case of using both the hydrogenated block copolymer (a) and the hydrogenated block copolymer (a') (Example 22), the results are that the tube moldability is good, the molding temperature is low, the melt tension is good and the kink resistance is good.

On the other hand, the tube of the resin composition using any of the hydrogenated block copolymer (a'-1) to (a'-3) or (a'-6) where the content of the polymer block (A) is more than 5% by mass is poor in kink resistance (Comparative Examples 10 to 12, 14 and 15). The resin composition using the hydrogenated copolymer (x-1) not containing the polymer block (A) is poor in tube moldability, and therefore failed in tube formation (Comparative Example 13).

Examples 24 to 28, Comparative Examples 16 to 18: Pressure Sensitive Adhesive Production According to the formulation and the blending ratio shown in Table 5 below, the components were premixed to prepare a pressure sensitive adhesive. The pressure sensitive adhesive was added to toluene to prepare a toluene solution thereof having a solid concentration of 30% by mass. Using a doctor blade, the toluene solution was applied onto a polyethylene terephthalate (PET) film having a thickness of 50 μm (trade name "Teijin Tetron Film G2", manufactured by Teijin DuPont Film Co., Ltd.) and dried at 110° C. for 5 minutes to produce a film having a pressure sensitive adhesive layer on the PET film serving as a substrate layer. In this film, the thickness of the pressure sensitive adhesive layer was 25 μm.

The resultant film was measured for the peel strength thereof and evaluated in point of adhesive deposit, according to the methods mentioned below. The results are shown in Table 5.

<(10) Peel Strength (23° C.)>

The film obtained in the following Examples and Comparative Examples was stuck to a smooth acrylic resin plate (trade name "Comoglass P", thickness 3 mm, manufactured by Kuraray Co., Ltd.) in such a manner that the pressure sensitive adhesive layer thereof could be kept in contact with the acrylic resin plate, and this was cut into a width of 25 mm to give a specimen. Using a 2-kg rubber roller, this specimen was pressed from the substrate layer side thereof at a rolling speed of 20 mm/min, and then left for 30 minutes in an atmosphere at 23±1° C. and a humidity of 50±5%. Subsequently, according to JIS Z 0237 (2009), the 180° peel strength from the protective film was measured at a peeling rate of 300 mm/min to be the peel strength (23° C.).

The peel strength (23° C.) is preferably 4.0 N/25 mm or more.

<(11) Adhesive Deposit Evaluation>

In the same manner as in the above (10), the specimen was, after pressed by rolling with the 2-kg rubber roller, left at a temperature of 80° C.±1° C. for 1 hour, then cooled in an atmosphere at 25° C. for 0.5 hours, and peeled, whereupon the adhesive deposit (pressure sensitive adhesive layer component) having remained on the surface of the acrylic resin plate was evaluated through visual observation.

The pressure sensitive adhesive is preferably given an evaluation rank A or B, more preferably an evaluation rank A.

A: No adhesive deposit at all.

B: Contaminant remained on the acrylic resin plate, and a white cloudy part was seen.

C: The pressure sensitive adhesive composition provided cohesion failure and gave adhesive deposit on the entire surface.

TABLE 5

| Pressure-Sensitive Adhesive | Total Mw of hydrogenated block copolymer (a) | Content of polymer block (A) (mass %) | Total Mw of polymer block (A) | | Example | | | | | Comparative Example | | |
|---|---|---|---|---|---|---|---|---|---|---|---|---|
| | | | | | 24 | 25 | 26 | 27 | 28 | 16 | 17 | 18 |
| Hydrogenated Block Copolymer (a-1) | 370000 | 4.0 | 10000 | (mass %) | 100 | | | | 80 | | | |
| Hydrogenated Block Copolymer (a-7) | 195000 | 4.9 | 6500 | (mass %) | | 100 | | | | | | |
| Hydrogenated Block Copolymer (a-8) | 175000 | 4.0 | 4600 | (mass %) | | | 100 | | | | | |
| Hydrogenated Block Copolymer (a-11) | 195000 | 4.9 | 6600 | (mass %) | | | | 100 | | | | |
| Hydrogenated Block Copolymer (a'-6) | 219000 | 12.0 | 16000 | (mass %) | | | | | | 100 | | 80 |
| Hydrogenated Copolymer (x-1) | 360000 | 0.0 | 0 | (mass %) | | | | | | | 100 | |
| Tackifier Resin*2 | | | | (mass %) | | | | | 20 | | | 20 |
| Peel Strength (23° C.) | | | | (N/25 mm) | 8.9 | 8.2 | 8.5 | 8.1 | 12.7 | 3.2 | 12.0 | 7.9 |
| Adhesive Deposit Evaluation | | | | (N/25 mm) | A | A | A | A | B | A | C | B |

[Description of Note in Table 5]
*2: Alicyclic petroleum resin "Alcon P-125", softening point 125±5° C., manufactured by Arakawa Chemical Industries, Ltd.

From the results in Table 5, it is known that the pressure sensitive adhesive using the hydrogenated block copolymer (a-1) or (a-8) is excellent in peel strength and gives little adhesive deposit. From comparison between Example 25 using the hydrogenated block copolymer (a-7) and Example 27 using the hydrogenated block copolymer (a-11), the result was that a triblock copolymer of A-B-A of the hydrogenated block copolymer (a-7) in which the polymer blocks (A) on the right and the left sides differ in Mw was more excellent in the peel strength than that in the case of using the hydrogenated block copolymer (a-11) in which the polymer blocks (A) on both sides are substantially the same in point of Mw.

On the other hand, the peel strength at 23° C. of the pressure sensitive adhesive using the hydrogenated block copolymer (a'-6) was low (Comparative Example 16). The peel strength of the pressure sensitive adhesive e using the hydrogenated copolymer (x-1) was noticeably low (Comparative Example 17). Regarding the hydrogenated block copolymer (a'-6) combined with a tackifier resin for improving the pressure sensitive adhesiveness of the resultant composition, the peel strength thereof increased, but the adhesive deposit remained. Namely, in this case, both high peel strength and adhesive deposit reduction could not be satisfied (Comparative Example 18).

Examples 29 to 31, Comparative Examples 19 to 20: Adhesive Production

According to the formulation and the blend ratio shown in Table 6, the components were melt-kneaded using a batch mixer at 230° C. and at a screw revolution speed of 200 rpm (200 min$^{-1}$) to produce an adhesive. The hardness and the adhesion strength of the adhesive were measured according to the methods mentioned below. The results are shown in Table 6.

<(12) Hardness>

The resin composition obtained in Examples and Comparative Examples was press-molded by compression at 230° C. and under a load of 100 kgf/cm$^2$ for 5 minutes, using a compression pressure-molding machine "NF-37" manufactured by Shinto Metal Industries Corporation and using a "Teflon (registered trademark)" coated metal frame as a spacer, and then further press-molded by compression at 18° C. and under a load of 15 kgf/cm$^2$ for 1 minute to produce a sheet having a thickness of 1 mm.

A dumbbell No. 5 piece according to JIS K 6251 (1993) was blanked out of the sheet to be a specimen.

The hardness of the resultant specimen was measured using a Type-A durometer indenter according to JIS K 6253-3 (2012). A lower hardness means more excellent flexibility.

<(13) Adhesion Strength>
(13-1) Production of Measurement Specimen (Laminate)
[Production of Laminate with Glass Plate]

Both surfaces of a glass plate having a length of 75 mm, a width of 25 mm and a thickness of 1 mm were washed with cleaning solutions of an aqueous surfactant solution, methanol, acetone and distilled water in that order, and dried. The glass plate, the sheet prepared in the above-mentioned measurement of "(12) Hardness", and a polyethylene terephthalate (PET) sheet having a thickness of 50 μm were layered in that order, and arranged in the center part of a metallic spacer having an outer dimension of 200 mm×200 mm, an inner dimension of 150 mm×150 mm and a thickness of 2 mm.

The layered sheets and the metallic spacer were sandwiched between polytetrafluoroethylene sheets, and further sandwiched between metal plates from the outside, and using a compression molding machine, this was compression-molded at a temperature of 160° C. under a load of 20 kgf/cm$^2$ (2 N/mm$^2$) for 3 minutes to produce a laminate of PET/resin composition/glass plate.

[Production of Laminate with Polypropylene Plate]

A laminate of PET/resin composition/polypropylene plate was produced according to the same operation as that for production of the laminate with glass plate mentioned above, except that a polypropylene plate having a length of 75 mm, a width of 25 mm and a thickness of 1 mm, as produced by injection molding of polypropylene ("Novatec PP MA3" (trade name), manufactured by Japan Polypropylene Corporation) was used.

(13-2) Measurement of Adhesion Strength

Using "Instron 5566" manufactured by Instron Corporation and according to JIS K 6854-2 (1999), the laminate produced in the above (13-1) was tested for adhesion strength at a peel angle of 180° and at a pulling rate of 50 mm/min thereby measuring the adhesion strength (peel strength) thereof. Those having a larger value are more excellent as adhesive.

TABLE 6

| Adhesive | Total Mw of hydrogenated block copolymer (a) | Content of polymer block (A) (mass %) | Total Mw of polymer block (A) | | Example 29 | 30 | 31 | Comparative Example 19 | 20 |
| --- | --- | --- | --- | --- | --- | --- | --- | --- | --- |
| Hydrogenated Block Copolymer (a-1) | 370000 | 4.0 | 10000 | (mass part) | 100 | | 100 | | |
| Hydrogenated Block Copolymer (a-8) | 175000 | 4.0 | 4600 | (mass part) | | 100 | | | |
| Hydrogenated Block Copolymer (a'-6) | 219000 | 12.0 | 16000 | (mass part) | | | | 100 | |
| Hydrogenated Copolymer (x-1) | 360000 | 0.0 | 0 | (mass part) | | | | | 100 |
| Polar Group-Having Polyolefinic Resin*3 | | | | (mass part) | 25 | 25 | 35 | 25 | 25 |
| Hardness | | | | Type A | 45 | 45 | 55 | 55 | 40 |
| Adhesion Strength | | Glass Plate | | (N/25 mm) | 56 | 50 | 70 | 56 | 20 |
| | | Polypropylene Plate | | (N/25 mm) | 103 | 55 | 120 | 100 | 20 |

[Description of Note in Table 6]
*3: This is a polar group-having polyolefinic resin produced according to the method mentioned below.
(Production Method for Polar Group-Having Polyolefinic Resin)

Using a batch mixer, 42 g of polypropylene "Prime Polypro F327" (MFR [230° C., load 2.16 kg (21 N)]=7 g/10 min, manufactured by Prime Polymer Co., Ltd.), 160 mg of maleic anhydride, and 42 mg of 2,5-dimethyl-2,5-di(tert-butylperoxy)hexane were melt-kneaded at 180° C. and at a screw revolution speed of 40 rpm (40 min$^{-1}$) to prepare a maleic anhydride group-having polypropylene. MFR [230° C., load 21 N] of the resultant maleic anhydride group-having polypropylene was 6 g/10 min, the proportion of the maleic anhydride group-having structural unit was 0.3%, and the melting point was 138° C.

The proportion of the maleic anhydride group-having structural unit was a value determined through titration of the resultant maleic anhydride group-having polypropylene with a methanol solution of potassium hydroxide. The melting point was a value read from the endothermic peak of the differential scanning calorimetry curve drawn at a heating rate of 10° C./min.

From the results of Table 6, it is known that the adhesive using the hydrogenated block copolymer (a-1) or (a-8) has a low hardness and is excellent in adhesiveness to glass plate and polypropylene plate.

On the other hand, the adhesive using the hydrogenated block copolymer (a'-6) or the hydrogenated copolymer (x-1) was poor in adhesiveness to glass plate and polypropylene plate (Comparative Examples 19 and 20).

Examples 32 to 34, Comparative Examples 21 to 22

All the components were premixed in the blending ratio (unit:mass part) shown in Table 8, and then fed to a twin-screw extruder ["TEX-44XCT" manufactured by The Japan Steel Works, Ltd., screw length (L)/screw diameter (D)=42], then melt-kneaded therein at a temperature of 170 to 200° C. and at a rotation speed of 300 $min^{-1}$, and hot-cut to produce a resin composition in the form of pellets.

The resultant pellet-like resin composition was tested and evaluated for the physical properties and the characteristics thereof according to the methods described below. The results are shown in Table 8.

<(14) Hardness>

The resin composition obtained in Examples was injection-molded using an injection-molding machine "EC75SX" (manufactured by Toshiba Machine Co., Ltd.) at a cylinder temperature of 230° C. to produce a sheet having a length of 100 mm, a width of 35 mm and a thickness of 2 mm. Next, according to JIS K 6253-3 (2012), three resultant sheets were layered to give a laminate having a thickness of 6 mm, and the hardness thereof was measured. A Type-A durometer was used as the hardness meter, and the momentary numerical value was recorded as a measured value.

Molded articles having a smaller hardness are more excellent in flexibility.

<(15) Injection Moldability>

The resin composition obtained in Examples was injection-molded using an injection-molding machine "EC75SX" (manufactured by Toshiba Machine Co., Ltd.) at a cylinder temperature of 230° C. to produce a sheet having a length of 100 mm, a width of 35 mm and a thickness of 2 mm, and the sheet was cut to give a specimen having a length of 50 mm and a width of 35 mm. The specimen was checked for presence or absence of flow marks through visual observation, and evaluated for the injection moldability thereof according to the following criteria. A is preferred.

A: No flow mark.
B: Few flow marks.
C: Many flow marks.

<(16) Adhesion Force>

According to the method mentioned below, the adhesion force to an adherend of vulcanized rubber was measured.
(Adherend of Vulcanized Rubber)
Vulcanized EPDM:

According to the compounding formulation shown in Table 7 below, ethylene/propylene/diene copolymer rubber "EPT4045" (manufactured by Mitsui Chemicals, Inc.), carbon black "Dia Black H" (manufactured by Mitsubishi Chemical Corporation), an antiaging agent "Nocrac 6C" (manufactured by Ouchi Shinko Chemical Industrial Co., Ltd.), stearic acid "Lunac S-20" (manufactured Kao Corporation) and zinc flower (zinc oxide) (manufactured by Sakai Chemical Industry Co., Ltd.) were kneaded at 150° C. for 6 minutes using a Banbury mixer (1st-stage kneading). Next, the resultant composition was taken out and cooled, and then according to the compounding formulation shown in Table 7, a vulcanizing agent "sulfur" (fine powder sulfur, 200 mesh, manufactured by Tsurumi Chemical Co., Ltd.) and a vulcanization accelerator (1) "Nocceler TS" (manufactured by Ouchi Shinko Chemical Industrial Co., Ltd.) and a vulcanization accelerator (2) "Nocceler M-P" (manufactured by Ouchi Shinko Chemical Industrial Co., Ltd.) were added thereto and kneaded at a temperature of 50° C. and under a pressure of 1 MPa for 20 minutes using a Banbury mixer (2nd-stage kneading) to give a kneaded product.

Further, using a compression molding machine, this was compression-molded under the vulcanization condition shown in Table 7 below to give a sheet (length 150 mm×width 150 mm×thickness 2 mm). A specimen having a length of 50 mm, a width of 35 mm and a thickness of 2 mm was blanked out of the sheet, and this was referred to as an adherend "vulcanized EPDM".

TABLE 7

|  |  | Vulcanized EPDM |
|---|---|---|
| 1st-stage kneading | Ethylene/propylene/diene copolymer rubber | 100 |
|  | Carbon black | 35 |
|  | Antiaging agent | 1 |
|  | Stearic acid | 1 |
|  | Zinc oxide | 5 |
| 2nd-stage kneading | Vulcanizing agent | 1.5 |
|  | Vulcanization accelerator (1) | 1.5 |
|  | Vulcanization accelerator (2) | 0.5 |
| Vulcanization condition | Vulcanization temperature (° C.) | 150 |
|  | Vulcanization pressure (MPa) | 1 |
|  | Vulcanization time (min) | 20 |

Unit: mass part

<Method for Measurement of Adhesion Force>

The adherend prepared as above (length 50 mm×width 35 mm×thickness 2 mm) was set in a cavity having a length of 100 mm, a width of 35 mm and a thickness of 2 mm, and using an injection molding machine "EC75SX" (manufactured by Toshiba Machine Co., Ltd.), a resin composition was injection-molded thereinto at 230° C. to produce a composite molded sheet. The composite molded sheet was completely fused to be one sheet having a thickness of 2 mm, that is, the adherend (vulcanized EPDM) and the resin composition adhered at the sides thereof (adhesion area: 35 mm×2 mm).

The resultant composite molded sheet (length 100 mm×width 35 mm×thickness 2 mm) was cut into a specimen having a length of 100 mm, a width of 10 mm and a thickness of 2 mm, and using an Instron universal tester "Instron 5566" (manufactured by Instron Japan Limited) at a temperature of 23° C. and at a pulling rate of 200 mm/min, the specimen was tested for the adhesion force between the resin composition and the adherend.

<(17) Weather Resistance>

According to the same operation as in the above "(15) Injection Moldability", a sheet (length 100 mm×width 35 mm×thickness 2 mm) was prepared. Using "Suntest CPS+" (light source: xenon, irradiation intensity: 550 W/$m^2$, manufactured by Toyo Seiki Seisaku-sho, Ltd.), this sheet was tested for light exposure for 24 hours. The feeling touch change before and after the test was investigated, and the weather resistance was evaluated according to the following criteria.

A: No change.
B: Somewhat sticky after the test.
C: Sticky after the test.

TABLE 8

|  | Total Mw of hydrogenated block copolymer (a) | Content of polymer block (A) (mass %) | Total Mw of polymer block (A) |  | Example 32 | Example 33 | Example 34 | Comparative Example 21 | Comparative Example 22 |
|---|---|---|---|---|---|---|---|---|---|
|  | Olefinic Rubber*4 |  |  | (mass part) | 37.9 | 37.9 | 37.9 | 37.9 | 37.9 |
| Hydrogenated Block Copolymer (a-1) | 370000 | 4.0 | 10000 | (mass part) | 15 |  | 12 |  |  |
| Hydrogenated Block Copolymer (a-8) | 175000 | 4.0 | 4600 | (mass part) |  | 15 |  |  |  |
| Hydrogenated Block Copolymer (a'-6) | 219000 | 12.0 | 16000 | (mass part) |  |  |  | 15 |  |
| Hydrogenated Copolymer (x-1) | 360000 | 0.0 | 0 | (mass part) |  |  |  |  | 15 |
|  | Polyolefinic Resin*5 |  |  | (mass part) | 28.9 | 28.9 | 31.9 | 28.9 | 28.9 |
|  | Softening agent*6 |  |  | (mass part) | 11.4 | 11.4 | 11.4 | 11.4 | 11.4 |
|  | Crosslinking Agent*7 |  |  | (mass part) | 2.3 | 2.3 | 2.3 | 2.3 | 2.3 |
|  | Crosslinking Aid*8 |  |  | (mass part) | 4.5 | 4.5 | 4.5 | 4.5 | 4.5 |
|  | Lubricant*9 |  |  | (mass part) | 0.3 | 0.3 | 0.3 | 0.3 | 0.3 |
|  | Hardness |  |  | Type A | 71 | 72 | 75 | 75 | — |
|  | Injection Moldability |  |  |  | A | A | A | A | — |
|  | Adhesion Force (vulcanized EPDM) |  |  | (N/cm) | 280 | 283 | 330 | 285 | — |
|  | Weather Resistance |  |  |  | A | A | A | A | — |

[Description of Notes in Table 8]
*4: Olefinic rubber: ethylene/propylene/5-ethylidene-2-norbornene copolymer rubber "JSR EP37F" (manufactured by JSR Corporation, iodine value=8, Mooney viscosity (ML 1+4, 100° C.)=100, ethylene content 54 mol %)
*5: Random polypropylene "J226T" (MFR [230° C., load 21.2 N]=20 g/10 min, manufactured by Prime Polymer Co., Ltd.)
*6: Paraffinic process oil "Diana Process PW-90" (kinematic viscosity=95.54 mm$^2$/s (40° C.), manufactured by Idemitsu Kosan Co., Ltd.)
*7: 2,5-Dimethyl-2,5-di(t-butylperoxy)hexane/silica (mass ratio: 40/60) "Perhexa (registered trademark) 25B-40" (manufactured by NOF Corporation)
*8: Triallyl isocyanurate/silica (mass ratio: 40/60) "Taic (registered trademark) WH-60" (manufactured by Nippon Kasei Chemical Co., Ltd.)
*9: Unsaturated fatty acid monoamide "Diamide (registered trademark) L-200" (manufactured by Nippon Kasei Chemical Co., Ltd.)

From the results in Table 8, it is known that the resin composition using the hydrogenated block copolymer (a-1) or the hydrogenated block copolymer (a-8) of the present invention has a low hardness and has good injection moldability, and is excellent in adhesion force to vulcanized EPDM and in weather resistance, and is therefore useful as weather seals.

On the other hand, the resin composition using the hydrogenated block copolymer (a'-6) has a high hardness (Comparative Example 21), and the resin composition using the hydrogenated copolymer (x-1) could not be uniformly pre-mixed since the hydrogenated copolymer (x-1) was semi-solid, and therefore could not be a resin composition having a predetermined blending ratio (Comparative Example 22).

Examples 35 to 38, Comparative Examples 23 to 25: Laminate Production

Using the materials shown in Table 9 below as a material for inner layer, a material for middle layer and a layer of outer layer and according to the blending ration shown in Table 9 below, a laminate (film) having a thickness of 200 μm was molded using a water-cooling downward inflation molding machine, at a resin temperature of 200° C., at a cooling water temperature of 20° C. and at a line speed of 10 m/min. The thickness of each layer was 20 μm of the inner layer, 130 μm of the middle layer and 50 μm of the outer layer. The physical properties of the resultant laminate were measured according to the methods mentioned below. The results are shown in Table 9.

Further, the crack propagation morphology in the laminate of Example 35 was observed using a scanning electron microscope (SEM), and the photograph thereof is shown in FIG. 3.

Regarding the evaluation and measurement methods in Table 9, the laminate having a thickness of 200 μm obtained in Examples and Comparative Examples were analyzed according to the methods mentioned below.

<(18) Melting Point>

Using a differential scanning calorimeter (DSC) "TGA/DSC1 Star System" (manufactured by Mettlermn Toledo Corporation), samples prepared by cutting the layers (outer layer, middle layer and inner layer) of each laminate were individually melted by heating from 30° C. up to 250° C. at a heating rate of 10° C./min, then cooled from 250° C. down to 30° C. at a cooling rate 10° C./min, and further again heated from 30° C. up to 250° C. at a heating rate of 10° C./min, and the peak top temperature of the main endothermic peak read in the process was referred to as the melting point of each layer.

<(19) Morphology>

Using a scanning probe microscope "Probe Station SPI4000/environment-controlled unit E-sweep" (manufactured by SII Nanotechnology Corporation), the morphology of the layer cross section was observed. The observation sample was prepared as follows. While kept frozen using liquid nitrogen, a sample was cut in a direction of MD (flow direction) with an ultramicrotome using a glass knife to expose the cross section thereof. For observation of cross section, a phase image in a direction of MD was taken in a DFM mode in a scanning size range of 10×10 μm and 2×2 μm at room temperature and under ordinary pressure, and the island phase (dispersion phase) within the scanning size was measured using a scale, and the data were averaged. Samples satisfying the following evaluation criterion A was evaluated as A.

A: A film having a phase separation structure to form both structures of an island phase or a bicontinuous structure having a long axis of 1 μm or more and an island phase having a long axis of 300 nm or less.

<(20) Young's Modulus>

A specimen having a size of 25 mm×75 mm was prepared, and using "Instron 3345" (manufactured by Instron Corporation), the Young's modulus thereof was measured under the condition of 5 mm/min. Samples having a smaller value are more excellent in flexibility. 300 MPa or less is a desired value.

<(21) Haze>

Using a haze meter "HR-100" (manufactured by Murakami Color Research Laboratory Co., Ltd.), haze was measured.

A smaller value indicates more excellent transparency. 20% or less is a desired value, and 16 or less is preferred.

<(22) Breaking Strength (Room Temperature)>

The laminate was cut out in a size of 15 cm×9 cm, and two cuts were layered in such a manner that the inner layers thereof could face to each other, and three of the four sides were heat-sealed at 140° C. and 0.4 MPa for a heating time of 1 second. 100 cc of water was poured into the resultant bag from one open mouth, and then the open side was heat-sealed in the same manner as above to be a liquid-packaging container having an internal capacity of 100 cc.

The resultant liquid-packaging container was put on an iron plate in an environment at 23° C., and an iron plate of 1 kg (9.8 N) was dropped thereonto three times from the above. The same measurement was carried out at intervals of 3 cm, and the uppermost height from which the bag did not break was referred to as an index of breaking strength at room temperature. A larger value indicates a higher breaking strength at room temperature. 70 cm or more is preferred, and 80 cm or more is more preferred.

After the breaking test, the liquid-packaging container was observed with a scanning electron microscope (SEM) to check the crack propagation running from the boundary between the heat-sealed part and the non-heat-sealed part of the inner layer, and evaluated according to the evaluation criteria mentioned below (see FIG. 4).

A: Cracks propagated in the direction parallel to the plane direction of the laminate along the interface of the inner layer and the middle layer (crack propagation mode A).

B: Cracks propagated toward the laminate surface (crack propagation mode B).

<(23) Breaking Strength (Low Temperature)>

The liquid-packaging container prepared in evaluation of the above (22) braking strength was put on an iron plate in an environment at 4° C., and an iron plate of 1 kg (9.8 N) was dropped thereonto three times from the above. The same measurement was carried out at intervals of 3 cm, and the uppermost height from which the bag did not break was referred to as an index of breaking strength at room temperature. A larger value indicates a higher breaking strength at low temperature. 17 cm or more is preferred, 20 cm or more is more preferred, and 22 cm or more is even more preferred.

TABLE 9

|  |  |  | Example | | | | Comparative Example | | |
| --- | --- | --- | --- | --- | --- | --- | --- | --- | --- |
|  |  |  | 35 | 36 | 37 | 38 | 23 | 24 | 25 |
| Outer Layer | PP1 | (mass %) | 95 | 95 | 95 | 95 | 95 | 95 | 95 |
|  | Hydrogenated Block Copolymer (a-1) | (mass %) | 5 | 5 | 5 | 5 | 5 | 5 | 5 |
|  | Melting point | (° C.) | 164 | 164 | 164 | 164 | 164 | 164 | 164 |
|  | Thickness | (μm) | 50 | 50 | 50 | 50 | 50 | 50 | 50 |
| Middle Layer | PP2 | (mass %) | 70 | 70 | 70 | 75 | 70 | 70 | 70 |
|  | Hydrogenated Block Copolymer (a-1) | (mass %) | 30 | 15 | 15 | 10 |  |  |  |
|  | Hydrogenated Block Copolymer (a'-6) | (mass %) |  |  |  |  | 15 | 15 |  |
|  | Hydrogenated Copolymer (x-1) | (mass %) |  |  |  |  |  |  | 15 |
|  | Hydrogenated Block Copolymer (y-1) | (mass %) |  | 15 |  | 15 | 15 |  | 15 |
|  | Ethylene-α-Olefin Copolymer*[10] | (mass %) |  |  | 15 |  |  | 15 |  |
|  | Melting point | (° C.) | 154 | 154 | 154 | 154 | 154 | 154 | 154 |
|  | Thickness | (μm) | 130 | 130 | 130 | 130 | 130 | 130 | 130 |
| Inner Layer | PP3 | (mass %) | 70 | 70 | 70 | 75 | 70 | 70 | 70 |
|  | Hydrogenated Block Copolymer (a-1) | (mass %) | 15 | 15 | 15 | 10 |  |  |  |
|  | Hydrogenated Block Copolymer (a'-6) | (mass %) |  |  |  |  | 15 | 15 |  |
|  | Hydrogenated Copolymer (x-1) | (mass %) |  |  |  |  |  |  | 15 |
|  | Hydrogenated Block Copolymer (y-1) | (mass %) | 15 | 15 |  | 15 | 15 |  | 15 |
|  | Ethylene-α-Olefin Copolymer*[10] | (mass %) |  |  | 15 |  |  | 15 |  |
|  | Melting point | (° C.) | 130 | 130 | 130 | 130 | 130 | 130 | 130 |
|  | Thickness | (μm) | 20 | 20 | 20 | 20 | 20 | 20 | 20 |
|  | Morphology (middle layer, inner layer) |  | A (inner layer) | A | A | A | A | A | — |
| Physical Properties of Laminate |  |  |  |  |  |  |  |  |  |
| Young's Modulus (before sterilization) | (MPa) |  | 160 | 190 | 200 | 260 | 240 | 250 | — |
| Haze | (%) |  | 9 | 11 | 13 | 15 | 13 | 16 | — |
| Breaking Strength (room temperature: 23° C.) | (cm) |  | 90 | >100 | >100 | 90 | >100 | >100 | — |
| Breaking Strength (low temperature: 4° C.) | (cm) |  | 25 | 23 | 23 | 18 | 21 | 21 | — |
| Crack Propagation Mode |  |  | A | A | A | A | A | A | — |

[Description of Note in Table 9]

*[10]: "Tafmer P-0775" (manufactured by Mitsui Chemicals, Inc.), ethylene-propylene random copolymer, MFR 0.6 g/10 min (230° C., 21.6 N), melting point 43° C., ethylene content 56 mol %

From the results in Table 9, it is known that the laminate using the hydrogenated block copolymer (a-1) has a low Young's modulus and a low haze, and has a high breaking strength, and is excellent in low-temperature breaking resistance, and in addition, the crack propagation morphology thereof is a desired one and the moldability thereof is good.

On the other hand, the laminate using the hydrogenated block copolymer (a'-6) and the hydrogenated block copolymer (y-1) or the ethylene-α-olefin copolymer has a high Young's modulus and a high haze, and is poor in low-temperature breaking resistance (Comparative Examples 23 and 24). In the case where the hydrogenated copolymer (x-1) and the hydrogenated block copolymer (y-1) were used without using the hydrogenated block copolymer (a-1), the components could not be uniformly premixed since the hydrogenated copolymer (x-1) was semisolid, and a film having a predetermined formulation ratio could not be obtained (Comparative Example 25).

The invention claimed is:

1. A resin composition comprising (a) a hydrogenated block copolymer, and (b) a polyolefinic resin, wherein:
   the content ratio of the component (a) to the component (b) [(a)/(b)] is, as a ratio by mass, from 1/99 to 99/1, wherein:
   (a) the hydrogenated block copolymer is a linear triblock copolymer having two polymer blocks (A) and one polymer block (B) of a type of A-B-A,
   wherein
   each polymer block (A) comprises a structural unit derived from an aromatic vinyl compound, and
   the polymer block (B) consists essentially of a structural unit derived from isoprene, a structural unit derived from butadiene, or a structural unit derived from a mixture of isoprene and butadiene, and
   wherein:
   the content of the polymer block (A) is 1% by mass or more and less than 5% by mass relative to the total amount of the hydrogenated block copolymer,
   the total content of the 1,2-bond and the 3,4-bond in the polymer block (B) is from 30 to 85 mol %,
   the hydrogenation rate of the polymer block (B) is 80 mol % or more, and the weight average molecular weight of the hydrogenated block copolymer is from 150,000 to 800,000.

2. The resin composition according to claim 1, wherein the weight average molecular weight of at least one polymer block (A) of the polymer block (A) is from 3,000 to 15,000.

3. The resin composition according to claim 1, wherein the polymer block (B) is a polymer block consisting essentially of a structural unit derived from a mixture of isoprene and butadiene, and the blending ratio of isoprene and butadiene is, as a molar ratio, isoprene/butadiene=10/90 to 90/10.

4. The resin composition according to claim 1, wherein the component (a) comprises a hydrogenated block copolymer in which the total weight average molecular weight of the polymer block (A) is 3,500 to 7,000 and a hydrogenated block copolymer in which the total weight average molecular weight of the polymer block (A) is more than 7,000 and 15,000 or less.

5. The resin composition according to claim 1, wherein the component (b) is a polypropylenic resin selected from the group consisting of a homopolypropylene, a propylene-ethylene random copolymer, a propylene-ethylene block copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer and a propylene-ethylene-hexene random copolymer.

6. The resin composition according to claim 1, wherein the component (b) is a polyolefinic resin containing a polar group.

7. The resin composition according to claim 6, wherein the polar group is at least one selected from the group consisting of a (meth)acryloyloxy group, a hydroxy group, an amide group, a halogen atom, a carboxy group, an ester group represented by —COOR wherein R is an alkyl group having 1 to 10 carbon atoms or an aryl group having 6 to 20 carbon atoms, and an acid anhydride group.

8. An adhesive comprising the resin composition according to claim 1.

9. A liquid-packaging container comprising a layer formed of the resin composition according to claim 1.

10. The liquid-packaging container according to claim 9, which is formed of a laminate of at least three layers having an inner layer, a middle layer and an outer layer, wherein at least one layer of the inner layer, the middle layer and the outer layer is formed of a resin composition, said resin composition comprising (a) a hydrogenated block copolymer, and (b) a polyolefinic resin, wherein:
    the content ratio of the component (a) to the component (b) [(a)/(b)] is, as a ratio by mass, from 1/99 to 99/1, wherein:
    (a) the hydrogenated block copolymer is a linear triblock copolymer having two polymer blocks (A) and one polymer block (B) of a type of A-B-A
    wherein
    each polymer block (A) comprises a structural unit derived from an aromatic vinyl compound, and
    the polymer block (B) consists essentially of a structural unit derived from isoprene, a structural unit derived from butadiene, or a structural unit derived from a mixture of isoprene and butadiene, and
    wherein:
    the content of the polymer block (A) is 1% by mass or more and less than 5% by mass relative to the total amount of the hydrogenated block copolymer,
    the total content of the 1,2-bond and the 3,4-bond in the polymer block (B) is from 30 to 85 mol %,
    the hydrogenation rate of the polymer block (B) is 80 mol % or more, and the weight average molecular weight of the hydrogenated block copolymer is from 150,000 to 800,000.

11. The liquid-packaging container according to claim 10, wherein both the inner layer and the middle layer or any one layer of the inner layer or the middle layer is formed of the resin composition and wherein:
    the melting point $MP_{in}$ of the resin component constituting the inner layer and the melting point $MP_{mid}$ of the resin component constituting the middle layer satisfy the following expression:

$$MP_{in} < MP_{mid}.$$

12. The liquid-packaging container according to claim 10, wherein the inner layer is formed of the resin composition, and the melting point $MP_{in}$ of the resin component constituting the inner layer and the melting point $MP_{out}$ of the resin component constituting the outer layer satisfy the following expression:

$$0 < MP_{out} - MP_{in} \leq 50.$$

13. The liquid-packaging container according to claim 10, wherein at least the inner layer is formed of the resin composition.

14. The liquid-packaging container according to claim 10, wherein the thickness of each layer is from 5 to 30 μm of the inner layer, from 100 to 300 μm of the middle layer, and from 15 to 120 μm of the outer layer.

15. A medical tool, which is formed of the resin composition according to claim 1.

16. A medical tube, which is formed of the resin composition according to claim 1.

17. The resin composition according to claim 1, wherein a content of a structural unit derived from isoprene, a structural unit derived from butadiene, or a structural unit derived from a mixture of isoprene and butadiene in the polymer block (B) is 95% by mass or more.

* * * * *